US009384101B2

(12) United States Patent
Calvo et al.

(10) Patent No.: US 9,384,101 B2
(45) Date of Patent: Jul. 5, 2016

(54) WEB APPLICATION ARCHITECTURE

(75) Inventors: Ramiro Calvo, Palo Alto, CA (US);
Onar Vikingstad, Sunnyvale, CA (US);
William Kakes, San Jose, CA (US);
Charles Everett Edwall, III, Sunnyvale, CA (US); Juan Camilo Pinzon, San Francisco, CA (US); Megan Frost, San Francisco, CA (US); Jae Woo Chang, San Jose, CA (US); Mischa McLachlan, San Francisco, CA (US); Everaldo Coelho, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 13/282,311

(22) Filed: Oct. 26, 2011

(65) Prior Publication Data

US 2013/0031462 A1    Jan. 31, 2013

Related U.S. Application Data

(60) Provisional application No. 61/511,938, filed on Jul. 26, 2011.

(51) Int. Cl.
*G06F 11/14*    (2006.01)
*G06F 11/07*    (2006.01)
*G06F 9/46*    (2006.01)
*G06F 9/54*    (2006.01)

(52) U.S. Cl.
CPC ............ *G06F 11/1482* (2013.01); *G06F 9/461* (2013.01); *G06F 9/545* (2013.01); *G06F 11/0745* (2013.01); *G06F 2209/541* (2013.01)

(58) Field of Classification Search
CPC ... G06F 17/2247; G06F 17/24; G06F 17/211; G06F 17/3089; G06F 17/30905; G06F 11/1458; G06F 11/1482; G06F 11/0745; G06F 9/545; G06F 9/461
USPC ........................................... 715/234
See application file for complete search history.

(56) References Cited

U.S. PATENT DOCUMENTS

| 6,609,146 | B1 | 8/2003 | Slotznick |
| 8,051,143 | B2 | 11/2011 | Pallamreddy et al. |
| 2001/0043235 | A1 | 11/2001 | Best et al. |
| 2002/0199187 | A1 | 12/2002 | Gissin et al. |
| 2006/0101336 | A1 | 5/2006 | Edwards et al. |
| 2007/0128899 | A1* | 6/2007 | Mayer ........................ 439/152 |
| 2007/0277109 | A1 | 11/2007 | Chen et al. |
| 2008/0313648 | A1* | 12/2008 | Wang et al. .................. 719/315 |
| 2009/0183155 | A1* | 7/2009 | Praitis ..................... G06F 9/468 718/100 |

(Continued)

OTHER PUBLICATIONS

"Background pages and background apps", Feb. 18, 2011, Chrome Web Store, Google, p. 3.*

(Continued)

*Primary Examiner* — Scott Baderman
*Assistant Examiner* — Seung Jung
(74) *Attorney, Agent, or Firm* — Blakely, Sokoloff, Taylor & Zafman LLP

(57) ABSTRACT

A web application architecture can use a wrapper application to provide a virtual machine environment within a web browser and web applications can run on the wrapper application. The wrapper application can provide life cycle management for the web applications and provide other functions such as log in and log out for all of the web applications in the environment.

19 Claims, 21 Drawing Sheets

(56) References Cited

U.S. PATENT DOCUMENTS

2011/0078708 A1   3/2011   Dokovski et al.
2011/0173602 A1   7/2011   Togami et al.

OTHER PUBLICATIONS

Joe Kissell, "Take Control of MobileMe", Oct. 2010, TidBITS Publishing Inc., 2nd Edition, p. 9, 11, 12, 17-21, 38, 63, 64, 67, 69, 76, 81, 101, 113, 121.*
Seth Ladd, "Introduction to Chrome Developer Tools, Part One", Jun. 18, 2010, Google, p. 1-4.*
Michael Mahemoff, "Extensions, Packaged Apps, and Hosted Apps in the Chrome Web Store", Sep. 2010, Google, p. 1, 2.*
Boris Smus, "Chrome Extension for Thesixtyone", Oct. 31, 2010, p. 1.*
WesCole, "Contacts.app Crashing with MobileMe", Jan. 18, 2011, MacRumors.com, http://forums.macrumors.com/showthread.php?t=1082289, p. 1.*
Andrew Wilson, Amping Up Chrome's Background Feature, Feb. 23, 2011, Google, http://blog.chromium.org/2011/02/amping-up-chromes-background-feature.html, p. 1.*
IIS Application Pool, Jan. 20, 2010, Microsoft, http://technet.microsoft.com/en-us/library/cc735247(v=ws.10).aspx, p. 1-2.*
PCT International Search Report and Written Opinion of the International Searching Authority for PCT/US2012/045736, mailed Oct. 24, 2012.
"Chapter 17—Controlling It All with Web-Based Desktops" In: Michael Miller: "Cloud Computing: Web-Based Applications That Change the Way You Work and Collaborate Online", Aug. 11, 2008, Que, XP55040638, ISBN: 978-0-78-973803-5 pp. 235-243, the whole document.
Joe Kissel: "Introduction, Chapters 1-7" In: "Take Control of MobileMe, Second Edition", Oct. 27, 2010, TidBITS Publishing, Inc., XP55040845, pp. 8-76, p. 8-p. 21, p. 37-p. 39, p. 62-p. 76.
"Chapter 19—Things to Know About Using Start Page" In: Scott Granneman: "Google Apps Deciphered: Compute in the Cloud to Streamline Your Desktop", Dec. 4, 2008, Prentice Hall, XP55040639, ISBN: 978-0-13-700470-6, pp. 300-310, the whole document.
"Chapter 8—iGoogle: Google Your Way" In: Nancy Conner: "Google Apps: The Missing Manual", May 27, 2008, O'Reilly Media, Inc., XP55040643, ISBN: 978-0-59-651579-9, pp. 411-446, the whole document.
Anonymous: "Tarantella Web-enabling Software, One World, One Network, One Answer, An SC0 Technical White Paper", SC0 Technical White Papers, Dec. 31, 1999, XP002251538, the whole document.
PCT International Preliminary Report on Patentability for PCT/US2012/045736 mailed Feb. 6, 2014.

\* cited by examiner

WEB APPLICATION ARCHITECTURE

This application claims the benefit of U.S. Provisional Patent Application No. 61/511,938, filed Jul. 26, 2011, and this provisional patent application is hereby incorporated herein by reference.

BACKGROUND OF THE INVENTION

The present invention relates to web applications and in particular to web applications which can provide such services as email services or calendar services or contact services, etc., through the use of a web browser on a client device which interacts with one or more web servers to provide the particular web service.

Web application systems in the prior art allow a user to access and interact with their email through a web browser. For example, web email allows a user to see and interact with their email through the use of a standard web browser rather than an email client. For example, email systems maintained on Microsoft's Exchange Server allow a user to access their email, calendar, and contacts through a web browser on any machine which can be connected to a network, so that the use of Entourage or Microsoft Outlook is not necessary to access email, etc. Internet service providers, such as Comcast, and Internet search providers, such as Google and Yahoo, also allow access to a user's email and other services through a conventional web browser.

SUMMARY OF THE DESCRIPTION

Various embodiments of a web application architecture are described herein. In one embodiment, a web application architecture includes a wrapper application which is configured to run on a standard web browser which itself runs on an operating system of a data processing system. A set of applications are configured to run on the wrapper application (for example, each application runs inside an iframe of the wrapper application), and each of the applications in the set of applications is configured to provide data to and from one or more web servers. The one or more web servers can store email data, calendar data, contact data, and other types of data. The wrapper application is configured to provide life cycle management for each application in the set of applications and can provide for switching between applications in the set of applications. The wrapper application can be considered a virtual-machine-like operating system which is running on the web browser which itself is running on another operating system, such as a preemptive multitasking operating system. In one embodiment, the set of applications can include an email application, and a calendar application, and a contact or address book application. In one embodiment, when each application in the set is presented, it is presented as the front most application with the other applications completely hidden or at least partially obscured, depending on the embodiment. In one embodiment, each of the applications, when presented, is presented within the same single web browser window which is provided by the web browser. In one embodiment, calls are transferred, through one or more Application Programming Interfaces (APIs), between the wrapper application and each application in the set of applications. These calls can be transferred when each of the applications is launched and when each of the applications is switched between being front most and not front most. The life cycle management provided by the wrapper application can include the launching and quitting of each application in the set of applications. Moreover, the wrapper application can transfer calls between the wrapper application and the web browser in order to support the running of each of the applications in the set of applications. In one embodiment, each application in the set of applications remains executing when it is not in the front most state (e.g., it is hidden completely or partially or suspended as described herein). In one embodiment, the wrapper application can present a set of icons, each icon representing an application in the set of applications, in response to a call from the web browser and the set of icons can form a palette of available applications to select or switch to.

In one embodiment, a method according to the present invention can include executing a first operating system, executing a web browser on the first operating system, executing a wrapper application on the web browser, and executing at least one application on the wrapper application. The wrapper application an provide life cycle management for the at east one application which can be part of a set of applications, such as an email application, a calendar application, a contact or address book application, etc. In one embodiment, the method can also include transferring at least one call, through an API, between the wrapper application and each application in the set of applications when each application is running or launching or terminating. Further, the method can also include transferring at least one call between the web browser and the wrapper application when, for example, the first application is launched. The transferring of at least one call can be one of issuing, initiating, invoking, or receiving a call or software message through an API.

At least in some embodiments, a machine readable non-transitory storage medium containing executable programming instructions can be used to implement the methods described herein. Also, data processing systems can be configured to operate as described herein, and these data processing systems can include desktop computers, laptop computers, tablet systems, smart phones, embedded devices, and other electronic devices such as other consumer electronic devices.

Other features of the present invention will be apparent from the accompanying drawings and from the detailed description which follows.

The above summary does not include an exhaustive list of all aspects of the present invention. It is contemplated that the invention includes all systems and methods that can be practiced from all suitable combinations various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

DETAILED DESCRIPTION

Figure 1:
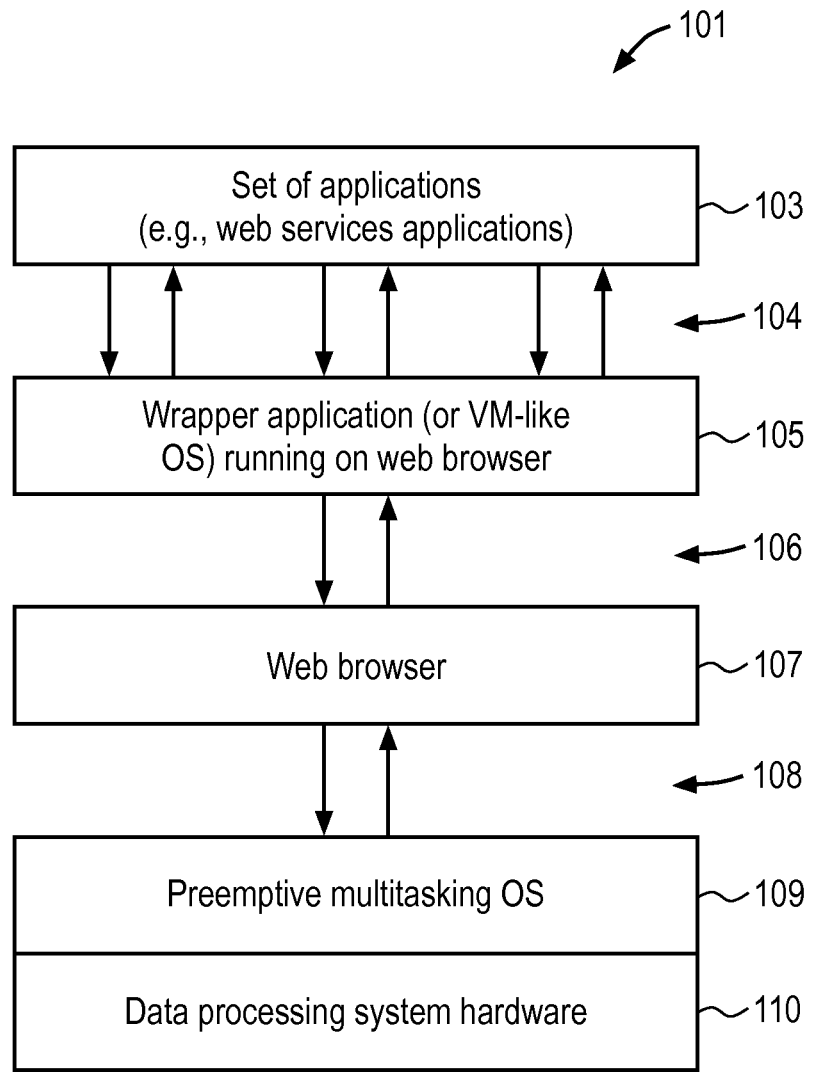
FIG. 1 shows an example of a software architecture for web applications.

Various embodiments and aspects of the inventions will be described with reference to details discussed below, and the accompanying drawings will illustrate the various embodiments. The following description and drawings are illustrative of the invention and are not to be construed as limiting the invention Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

A web application architecture can utilize a wrapper application which can provide a virtual-machine-like environment or operating system running on a web browser. A set of one or more web applications, such as an email application or a calendar application or a contacts application or another application can run on top of the wrapper application which can provide life cycle management for each of the applications in the set of applications. The wrapper application can allow for each of the applications to continue to execute after they are launched while switching between applications in the set of applications, and this can all be performed within a single web browser window. The wrapper application can provide for a single log in point to authenticate a user for all of the web applications in the set of applications, and the wrapper application can provide for automatic log out in all of the launched web applications once a log out (or expiration of an authentication time period) has occurred in one application. This environment created through this architecture can provide a better user interface for a user because, for example, fewer windows need to be opened and the state and context of each executing web application can be maintained as a user switches between applications without having to open up multiple windows or multiple tabs in a single web browser window. This environment can also allow for notification (e.g., push notifications) to be provided for hidden applications and can allow for application errors to be isolated and recoverable without effecting other applications.

FIG. 1 shows an example of a web application architecture which has the software stack shown in FIG. 1. In this architecture 101, a set of applications 103 operates through one or more APIs 104 with a wrapper application 105 which runs on the web browser 107 through one or more APIs 106. The web browser 107 in turn runs through one or more APIs 108 on a preemptive multitasking operating system 109 in one embodiment; in another embodiment, the multitasking operating system may be replaced by other known operating systems which are not preemptive or not multitasking. All the software shown in the software stack of FIG. 1 operates on a data processing system, and in particular on the hardware of the data processing system 110.

The set of applications 103 can be web applications or web services applications, such as web email applications, web calendar applications, web contact or address book applications, web document applications (e.g., access to iWork documents), map applications such as applications for navigation or applications for finding a device, such as finding a smart phone, and other applications which can be implemented as a web application through a web browser which is in communication with one or more web servers to exchange data between the web application and the one or more web servers. The user data, such as emails, calendar data, contact data, etc. can be stored on one or more web servers and can be accessed and used through a web browser on a client device. Examples of user interfaces for various web applications are provided in FIGS. 11-15 and are described further below. These applications in the set of applications can operate on one or client devices, such as the client device 605 shown in FIG. 6 which can have the data processing system hardware 110, and a client device can have the architecture shown in FIG. 16 and can be a desktop computer or a laptop computer or a tablet system or a smart phone, or a gaming device such as a game console or other consumer electronic devices. The one or more APIs 104 can provide a variety of calls for functions or operations between the set of applications 103 and the wrapper application 105. FIGS. 4 and 5A-5D provide examples of such APIs and the calls for such APIs, and further background information in connection with APIs is provided in conjunction with FIGS. 17 and 18. It will be understood that the term transfer or transferring in connection with a call or API includes one of issuing or initiating or invoking or receiving a call or software message through the API. In one embodiment, each of the applications in the set of applications can be written in part or entirely in JavaScript, and in one embodiment, each of the applications can execute, in one embodiment, inside an iframe which runs in the wrapper application 105 which itself can be written at least in part in JavaScript and which runs on the web browser 107.

The wrapper application 105 can provide, in one embodiment, a virtual machine environment for the set of applications 103 and can run on the web browser 107 and can transfer calls between the wrapper application on and the web browser through the API 106. FIGS. 5A-5D provides some examples of calls through the API 106. In one embodiment, the wrapper application owns the URL text entry field in the web browser and uses calls to the web browser to control the URL field and uses calls to the web browser to control the title bar; for example, the wrapper application can, through calls between the wrapper application and the web browser, change the name in the title bar to reflect the currently front most application. Examples of how the wrapper application controls the name in the title bar are shown in FIGS. 11 through 15. The wrapper application can provide for life cycle management for each application in the set of applications. In one embodiment, this can include launching and quitting each of the applications. Furthermore, the wrapper application can provide other features and functions and operations including switching between applications, and handling errors of an application (e.g., tearing down a misbehaving or crashed application and offering to relaunch the application for a user). Further, in one embodiment the wrapper application can force a shutdown of an inactive or crashed or badly behaving application. Further, the wrapper application can also provide a single log in and single log out point for the user and for all the applications in the set of applications. In one embodiment, the wrapper application may not include certain features of a traditional operating system, such as a kernel, and memory handling, and scheduling of the operations of processes and threads, although in another embodiment, the wrapper application may include these functions or features or a portion of these functions or features of a traditional operating system.

In one embodiment, the wrapper application can also provide for push notification to one or more of the web applications in the set of applications 103, and can, in one embodiment, allow a push notification to be presented for an application which is not front most through a user interface on the application which is front most in the set of applications 103. In one embodiment, the wrapper application and the set of applications 103 operate in a memory space which is defined by the memory space of the web browser and operate within a thread or process which is defined by the web browser's window in which the wrapper application and the set of applications 103 are running.

Web browser 107 can be a conventional web browser, such as Internet Explorer from Microsoft, or Safari from Apple Inc. of Cupertino, Calif., or Firefox, or Opera, or other known web browsers. A web browser is a software application program that processes a web page encoded in a markup language, such as HTML; the web page is retrieved by the web browser through one or more URLs (Uniform Resource Locator). The web browser in one embodiment is configured to process, using a layout engine in the web browser, the markup language of the web page into a DOM (document object model) of the web page, and further the web browser can be configured to process a cascading style sheet associated with the web page to present the web page. In one embodiment, the web browser 107 can use one or more APIs 108 to interact with the operating system 109, and these APIs can support calls to the operating system for windowing and networking functions, such as TCP/IP, etc. as is known in the art.

Figure 2:
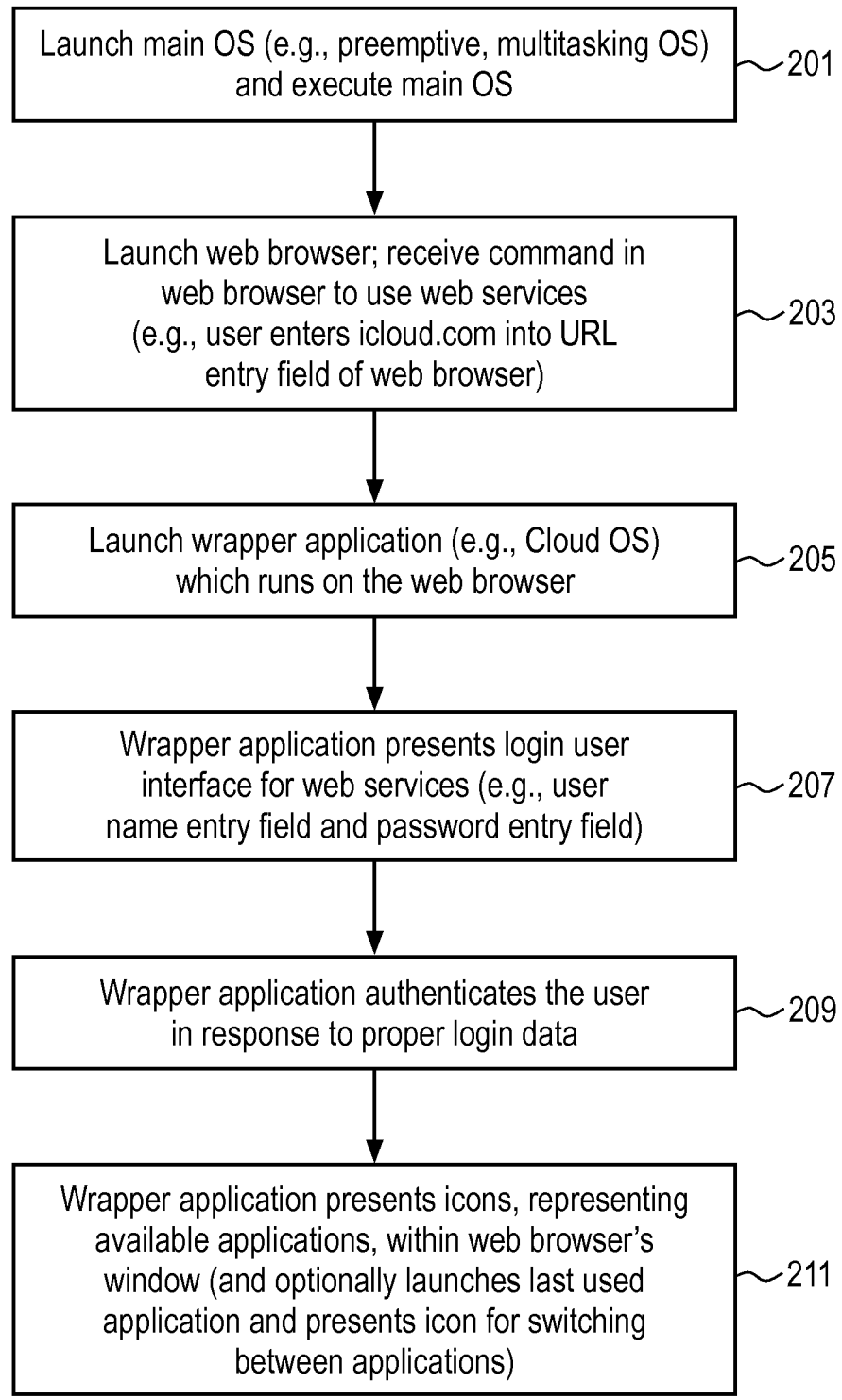
FIG. 2 shows an example of a method, in flowchart form, according to one embodiment of the present invention.

FIG. 2 shows an example of a method which can be used with the software architecture shown in FIG. 1. In operation 201, the main operating system, such as operating system 109 is launched and executes on the data processing system 110 which can be, for example, the one or more client devices shown in FIG. 6 and can have the architecture shown in FIG. 16, which is described below. Next, in operation 203 a web browser can be launched to cause the web browser to execute on the main operating system; the web browser can be the web browser 107 executing on the operating system 109 shown in FIG. 1. A user can operate the web browser as is known in the art to visit web pages, see TV shows or movies or check sports events and scores or check weather or stocks or other uses of a conventional web browser as is known in the art. In addition, the user can decide to use a web service such as web mail or other web services described herein. This can be done by directing the web browser to a particular URL which is an entry point for one or more web services as described herein. For example, in one embodiment, the user may enter the text "icloud.com" into the URL entry field of the web browser 107. In response to the entry of this command, such as the icloud.com URL, the wrapper application 105 is launched and runs on the web browser 107; this is shown as operation 205 in FIG. 2. It is assumed, in the flow of FIG. 2, that the wrapper application and the set of applications 103 which run on the application have already been installed on the data processing system; for example, the user has previously used these web applications and they have been downloaded as described in conjunction with FIGS. 5A-5D and have been cached in the web browser's caches. As noted herein, the wrapper application and each of the applications in the set of applications 103 can be written in JavaScript. After the wrapper application is launched in operation 205, the wrapper application presents, in operation 207 a log in window or user interface in the web browser's window; the user can then enter the log in data required by the system, such as, for example, a user name and a user password. Then, the system, in the manner described in conjunction with FIGS. 5A-5D, authenticates the user using, for example, a setup service, such as the setup service 607 shown in FIG. 6. In operation 209 the wrapper application will authenticate, in one embodiment, the user for all applications which execute in the set of applications 103 through the single log in process and will do so in response to proper log in data entered by the user or by the system on behalf of the user. In addition, in one embodiment, the wrapper application provides an automatic log out when, for example, the web browser's window in which the wrapper application and the setup applications are executing is closed. In operation 211, after authentication the wrapper application can present, in one embodiment, icons representing the available applications, which are the applications in the set of applications 103 which are available to the authenticated user. In one embodiment this can include an email application, a contacts or address book application, a calendar application, and other applications or web applications described herein or are known in the art. The wrapper application, in operation 211, presents the icons within the web browser's window, and the user can select one of the icons to cause the corresponding application in the set of applications 103 to launch and thereby execute. Optionally, the wrapper application can launch the last used application in the set of applications 103 and can additionally present an icon which can be used for switching between applications as is described further below.

Figure 3:
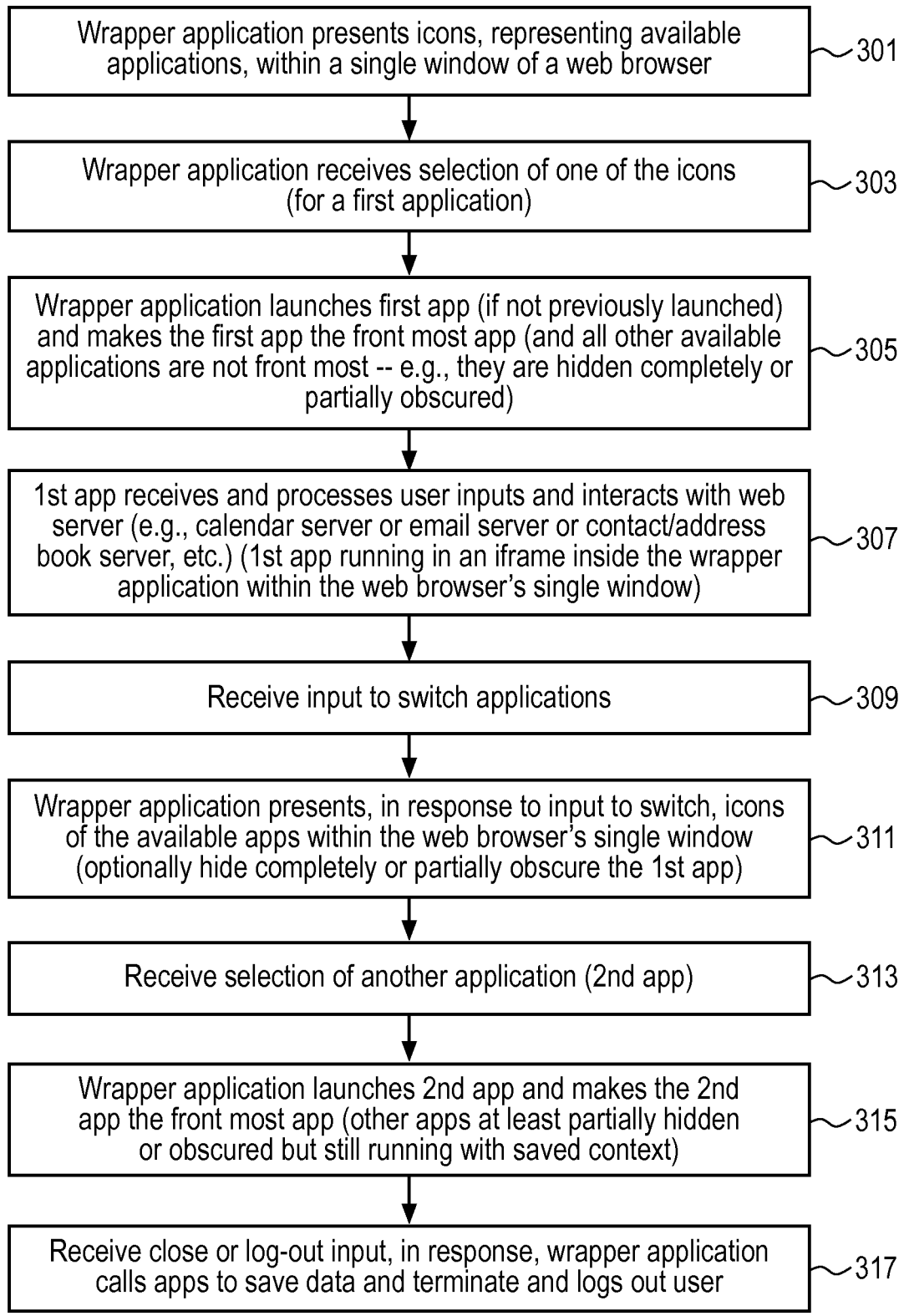
FIG. 3 is a flowchart illustrating the method according to one embodiment of the present invention.
Figure 8A:
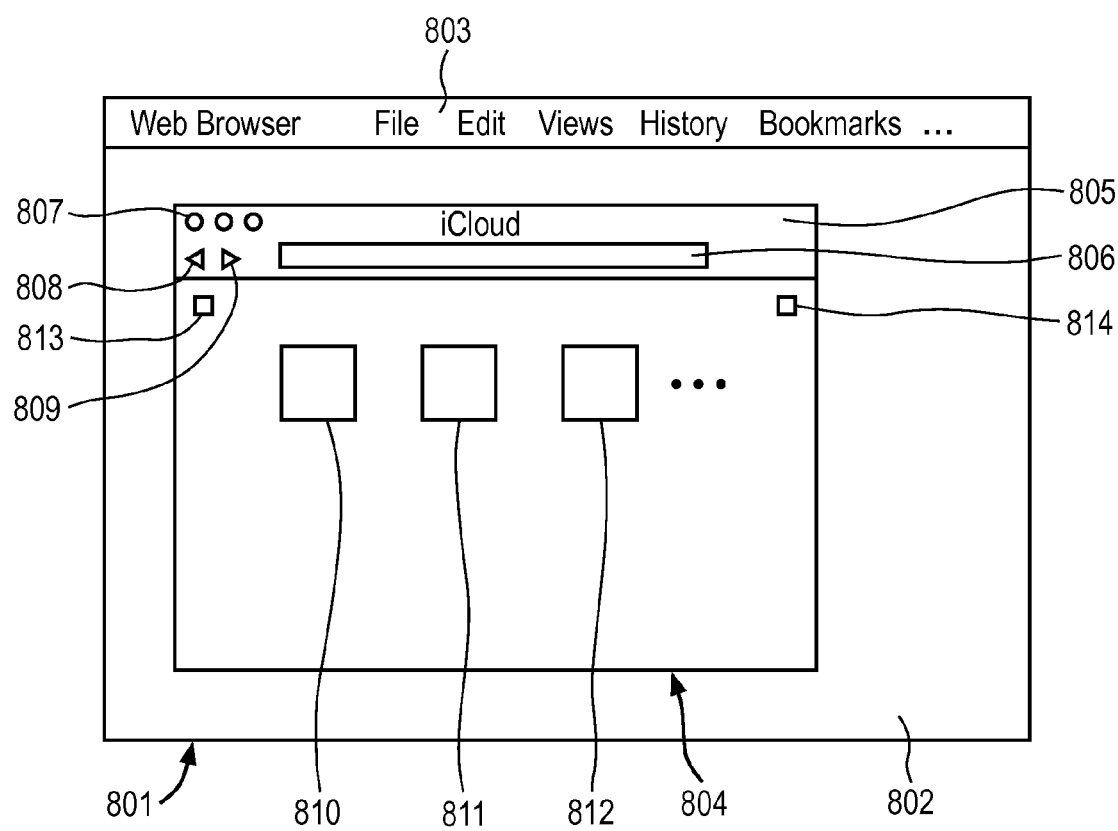
FIG. 8A shows an example of graphical user interface of one embodiment which can be used to select one or more web applications.
Figure 9:
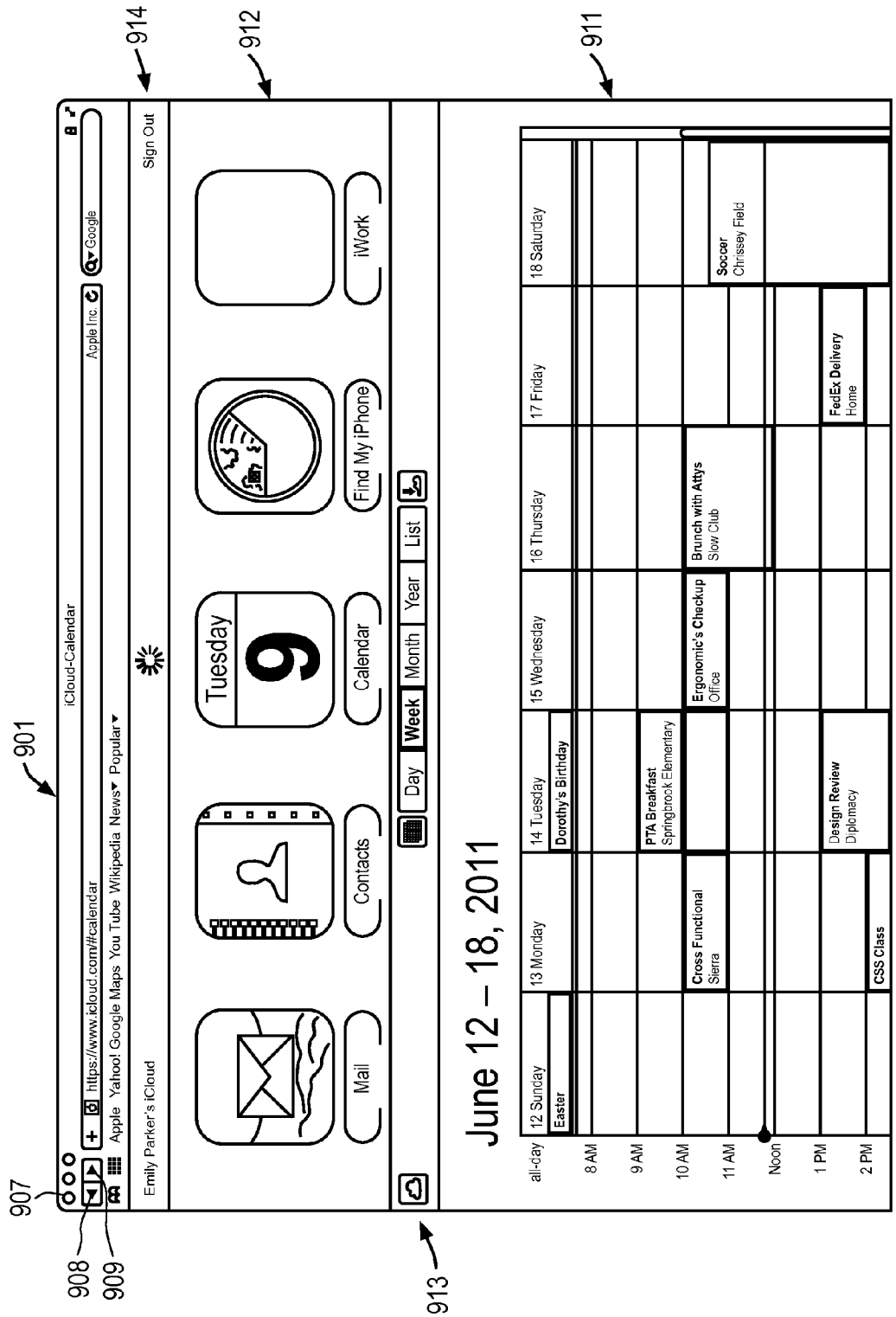
FIG. 9 shows another example of a graphical user interface which can be used to select one or more web applications.
Figure 10:
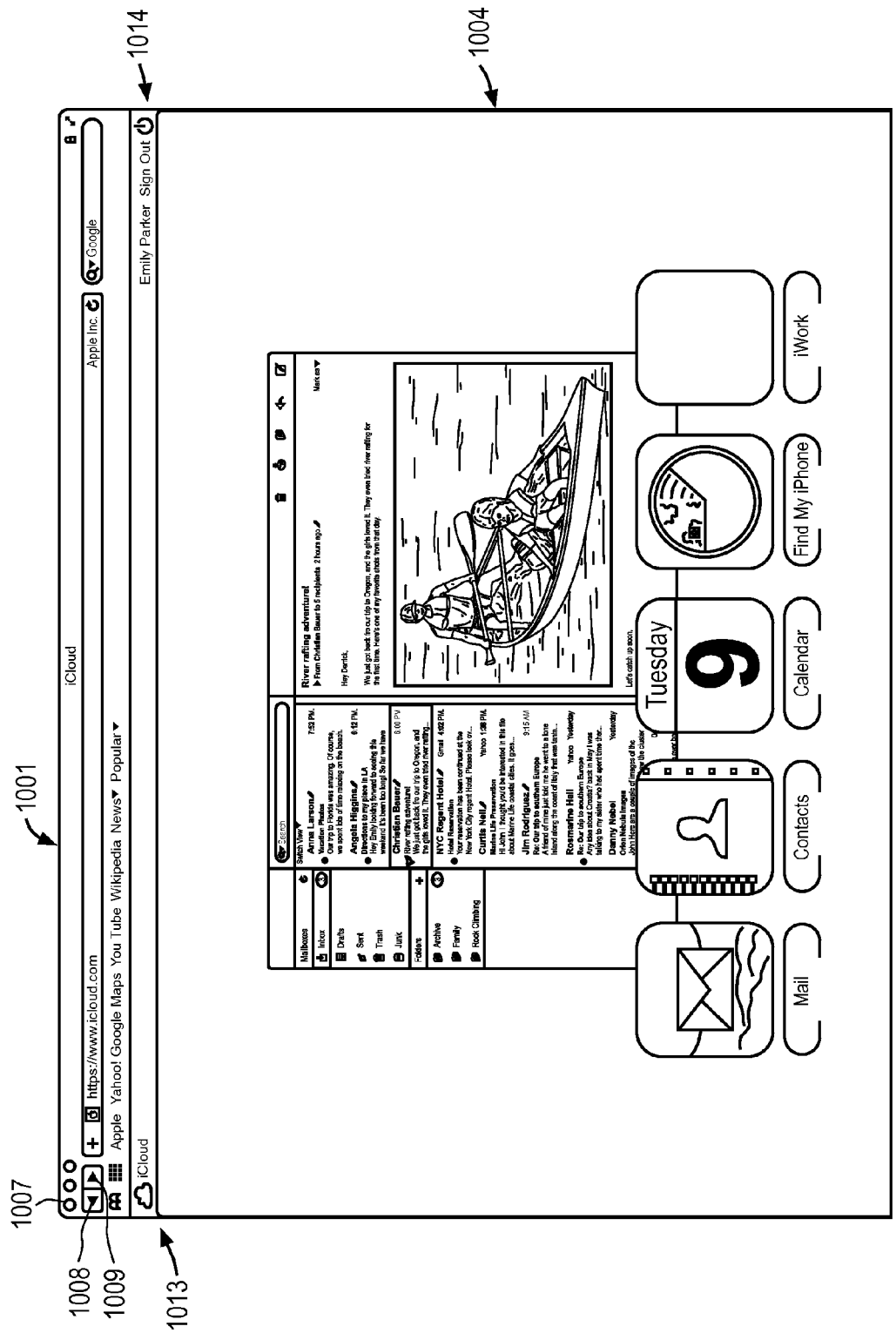
FIG. 10 shows another example of a graphical user interface which can be used to select one or more web applications.

While FIG. 2 shows a method which can be used to get the software stack shown in FIG. 1 to be up and running, FIG. 3 shows a method in one embodiment for the use of that software stack, which includes switching between the applications in the set of applications 103 which are, in one embodiment, each executing in an iframe within the wrapper application 105 which itself runs on web browser 107. In operation 301, the wrapper application, such as wrapper application 105 presents icons, representing available applications in the set of applications 103, in a user interface within a single window of a web browser. An example of such a user interface is shown in FIG. 8A and in FIG. 8B. Alternative user interfaces presenting such icons is also shown in FIGS. 9 and 10. When a user selects one of those icons, this will cause the corresponding application in the set of applications 103 to launch if not previously launched and will cause that application to be front most. For example, in operation 303, the wrapper application receives a selection of one of the icons which is referred to as the first application in operation 103. The selection may be from a user positioning a cursor on the icon or the use tapping on the icon with the user's finger or other inputs known in the art. In response to this selection in operation 305, the wrapper application launches the first app or application if not previously launched and makes that first app the front most app or application. All other available applications that are not front most are either completely hidden or partially obscured depending upon the implementation of the user interface. In the examples shown in FIGS. 11 through 15, the other available applications which are not front most are completely hidden and the user can return or switch to those by selecting an icon or other command. In one embodiment, that icon can be referred to as a switcher icon such as the icon 813 shown in FIGS. 8A and 8B as well as FIGS. 11 through 15. The selection of that icon will cause the presentation of the set of icons shown in FIG. 8A or 8B, or each icon represents the set of available applications for the authenticated user. After the first app or application has been made front most, the user can then interact with it. This is shown in operation 307 in which the first app receives and processes user inputs and interacts with one or more web servers, such as a calendar server or email server or a contact/address book server, etc.

Figure 6:
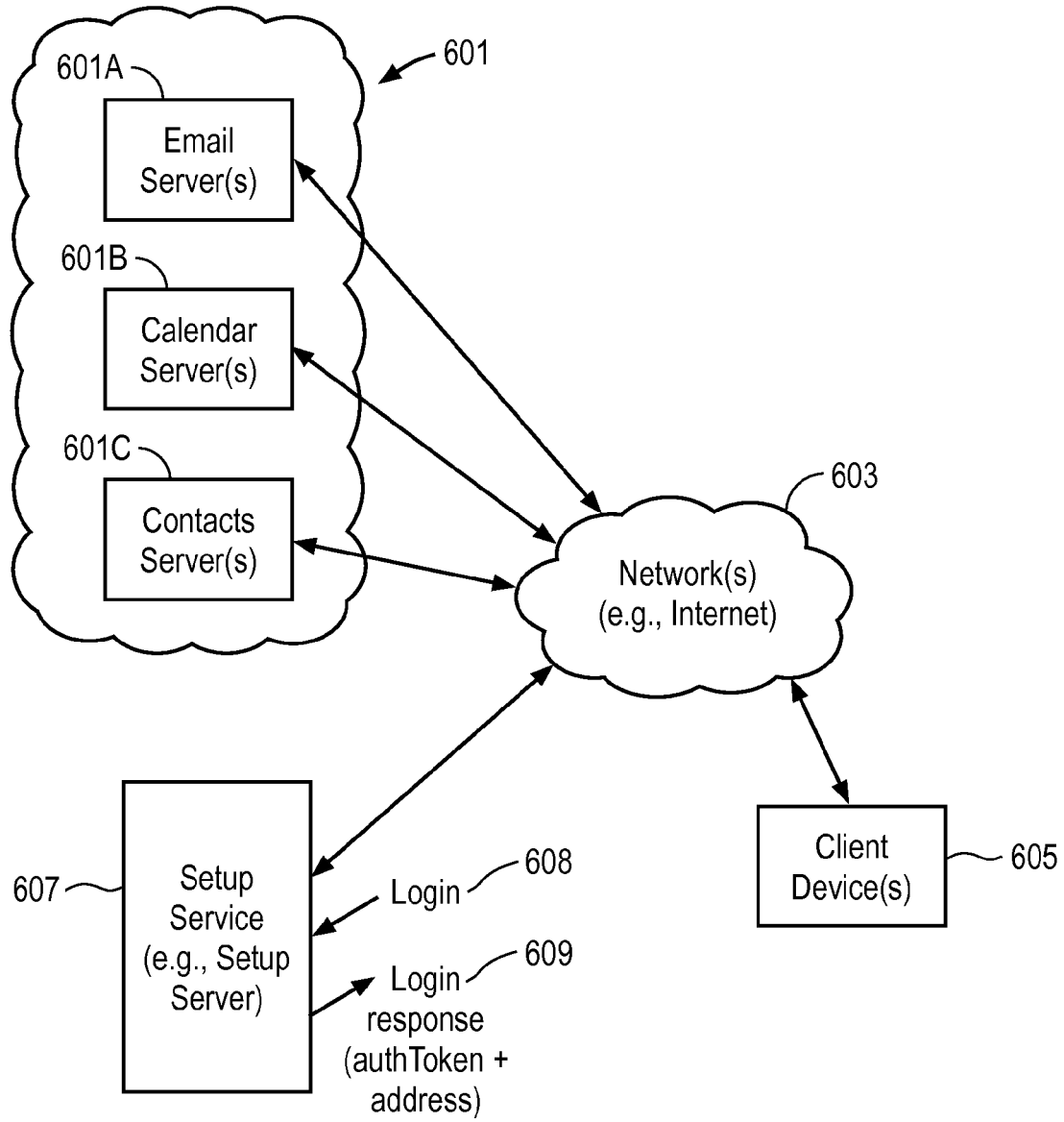
FIG. 6 shows an example of a plurality of systems interconnected through one or more networks to provide web services to one or more client devices coupled through the one or more networks to the one or more servers.

FIG. 6 shows examples of such web servers which can interact with one or more client devices. It will be understood that the user at one point in time can be using one client device, such as the user's client device at the user's office and be using, at another point in time, another client device, such as a computer at home for the user, and in each case a conventional or standard web browser can be used with a web application to access the data and to interact with the data stored on the one or more web servers, such as those shown in FIG. 6.

Figure 11:
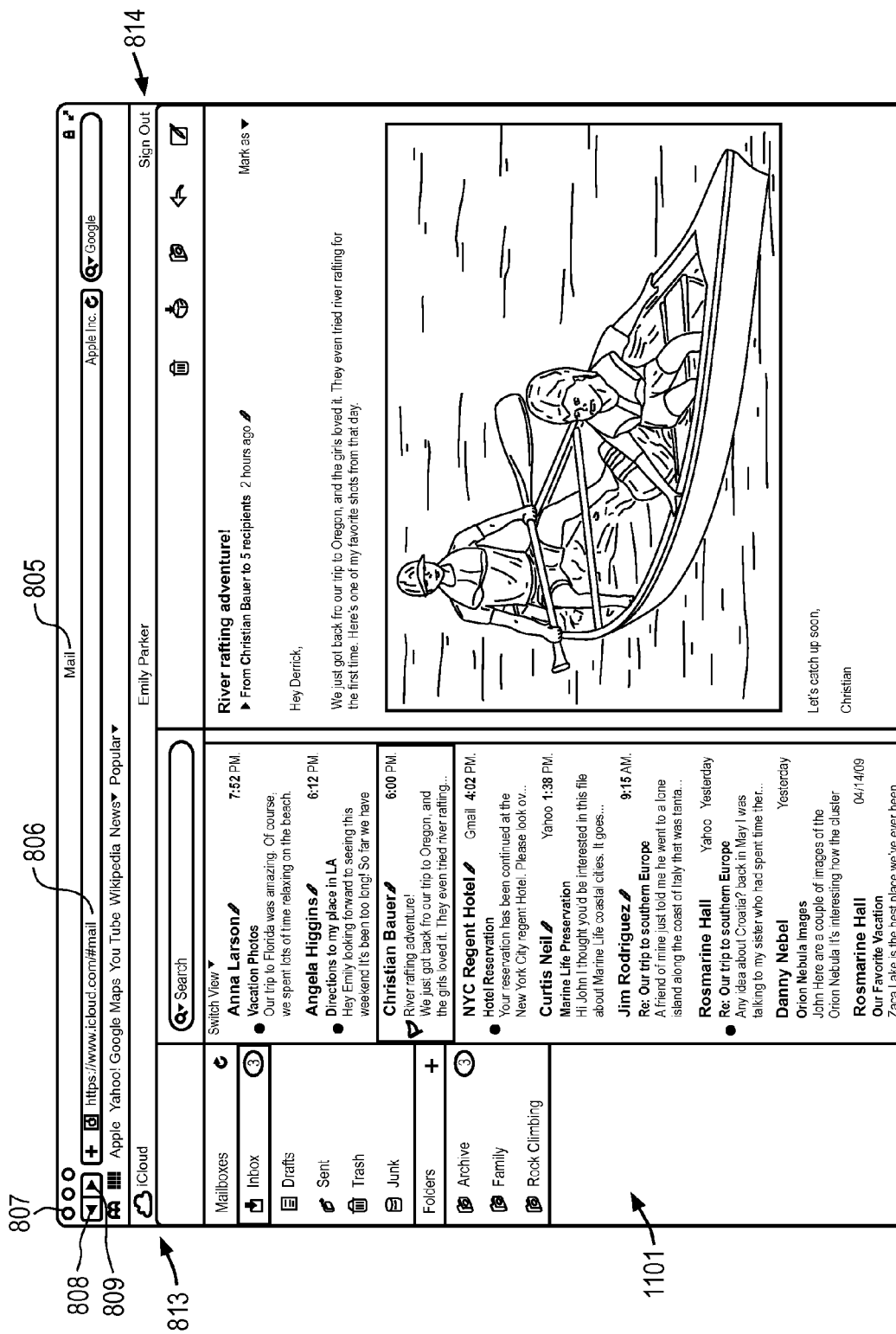
FIG. 11 shows an example of a graphical user interface for an email web application.

In one embodiment, as shown in operation 307, the first app is running within an iframe inside the wrapper application 105 which itself is running within the web browser's single window which is provided by web browser 107. At any point in time during the use of the first app, the user can decide to switch to one of the other available apps in the set of applications 103, and this is shown in operation 309 in which the web browser receives in one embodiment the input to switch applications. For example, the web browser can receive an input to the switcher icon 813 and can pass through a call that input to the first app which in turn calls the wrapper application 105 which then presents the icons as in operation 301 described above. For example, the set of icons again represent the available set of applications and can be presented in a user interface as shown FIG. 8A or 813 or in the alternative user interface shown in FIG. 9 or the alternative user interface shown in FIG. 10. As shown in operation 311, the wrapper application can present, in response to the input to switch received in operation 309, the icons of the available applications within the same web browser's single window that previously displayed the first app. In other words, the method of FIG. 3 can use the same single web browser window. In one embodiment, the wrapper application causes the complete hiding of the first app when the icons are presented after selection of the switcher icon. For example, if the first app is an email application as shown in FIG. 11 and if the user selects the switcher icon 813, this causes the presentation of the set of icons shown in FIG. 8A and the email application 1101 is no longer presented within the web browser's single window and it has been completely hidden from view while the set of icons is presented. FIG. 9 shows an alternative user interface in which the previously used application continues to be presented while the set of icons used to switch between applications or select applications is displayed in a region in the web browser's window which can be referred to as a drawer region; similarly, FIG. 10 shows an example of a user interface where the previously used application, such as the first app in the method of FIG. 3, continues to be presented behind the set of icons which are used to select or switch between applications in the set of applications 103. In operation 313, the system receives a selection of another application which may be referred to as the second app, which is one of the applications in the set of applications 103. In response to this selection, the wrapper application launches the second app (if not previously launched) and makes the second app the front most app. Further, the wrapper application will cause all other executing applications to be at least partially hidden or obscured, however, those other applications can, in one embodiment, still remain executing with a saved context and data. So, for example, if a user was entering contact data for a new personal contact and decided, while entering that data to switch to the calendar application or the email application, that new data and the context of that data will remain saved while it is hidden at least partially and those hidden applications continue to execute with the saved context and data, including the context of the text input focus and position of the last input as well as the user data entered. In one embodiment, this may extend even to modal dialogue boxes presented within the last executed application such that the state of those modal dialogue boxes is retained while the application is not front most within the same single web browser window. Also in operation 315, the set of icons presented by operation 311 will also be removed so that the user, in one embodiment, sees only the second application or second app while the other apps are at least partially hidden.

Figure 8B:
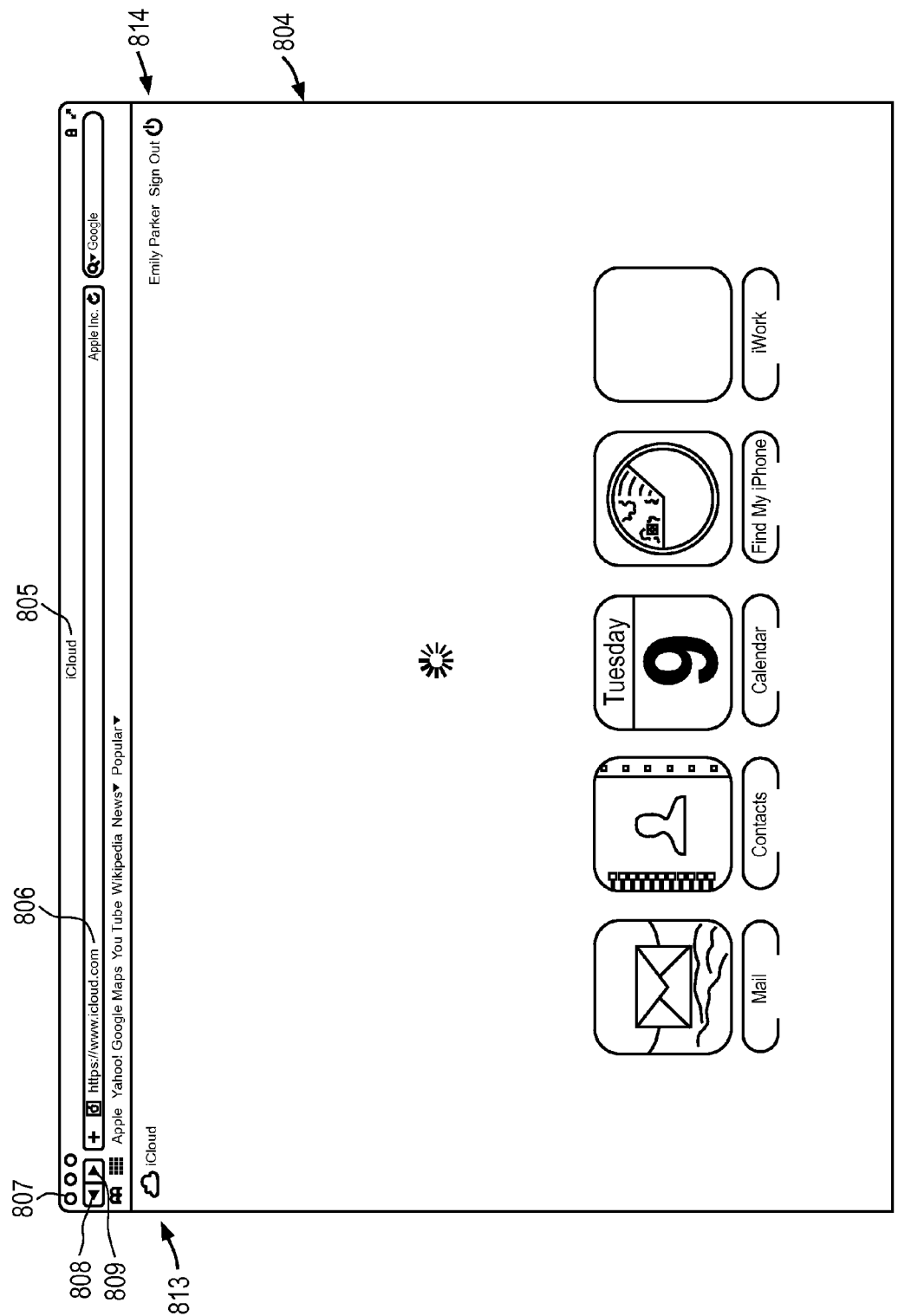
FIG. 8B shows another example of a graphical user interface which can be used to select one or more web applications.
Figure 12:
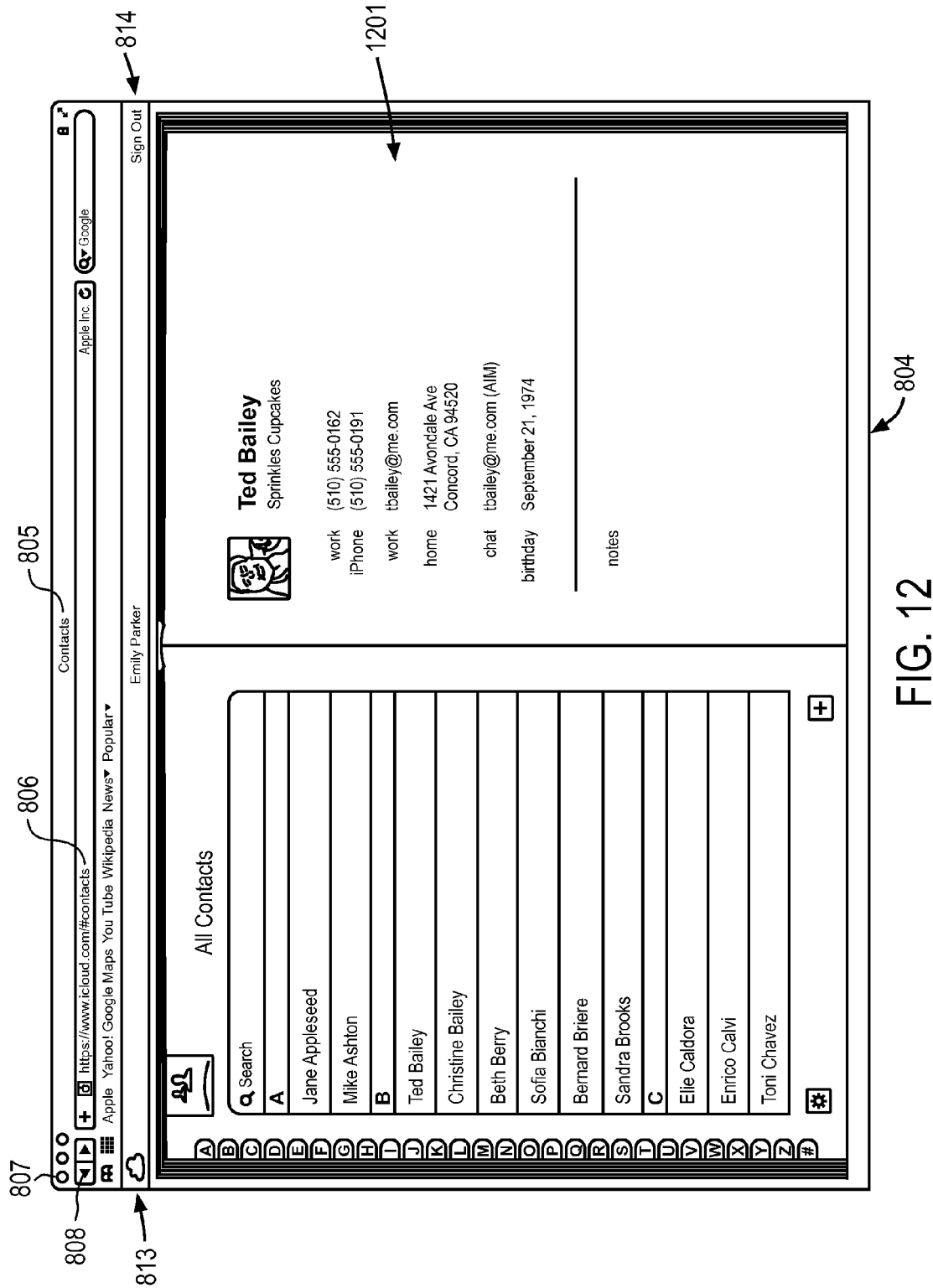
FIG. 12 shows an example of a graphical user interface for a contact or address book web application.

An example of operations 311, 313, and 315 will now be provided while referring to FIGS. 8B, 11, and 12. Operation 311 can, in one embodiment, present the user interface shown in FIG. 8B which presents the icons for a set of applications 103 which are available to the authenticated user. The presentation of those icons can occur by selecting the switcher icon 813. It will be assumed that the user was previously using the email web application 1101 as shown in FIG. 11 and decided to switch to the contact web application in the set of applications 103. This can be performed by selecting the switcher icon 813. In an alternative embodiment, this could be performed by selecting the set of available applications in the set of applications 103 through a pull-down menu or other menu or other user interface known in the art. The selection of the switcher icon 813 causes the presentation of the icons shown in FIG. 8 after the user had been previously using the email application 1101. Then the user can select the contacts icon shown in FIG. 8B to cause the presentation of the user interface of the contacts application 1201 shown in FIG. 12 which, in the context of operation 315, is the second app which is launched by wrapper application 105. At this point the user can close the web browser window by selecting a close command or selecting the close button 807 shown in FIG. 8B. Alternatively, the user can decide to log out or sign out by selecting the signout button 814 shown in FIG. 8B. In response, in operation 317, the wrapper application will cause each executing application to save its data and will then terminate and tear down each launched application and will log out the user for each launched application. In this way, the wrapper application provides a single point for the user to deal with all of the launched applications and to terminate all launched applications and log out of the web services for each of those web applications. In this particular embodiment, this simplifies the user interface and the user's interaction with the variety of web services as it does not require the user to log out of each individual web service.

While the method shown in FIG. 3 shows the use of two applications in the set of applications 103, it will be appreciated that more applications can be launched and used concurrently and all, in one embodiment, being presented within the same web browser window, without a tab interface, and each of which executes as an iframe or in an iframe within the wrapper application which is running on the web browser in the same web browser window. In one embodiment, the memory space of that web browser window is also allocated to the wrapper application and each application in the set of applications 103 which are restricted to run within that memory space allocated to that particular web browser window.

Figure 4:
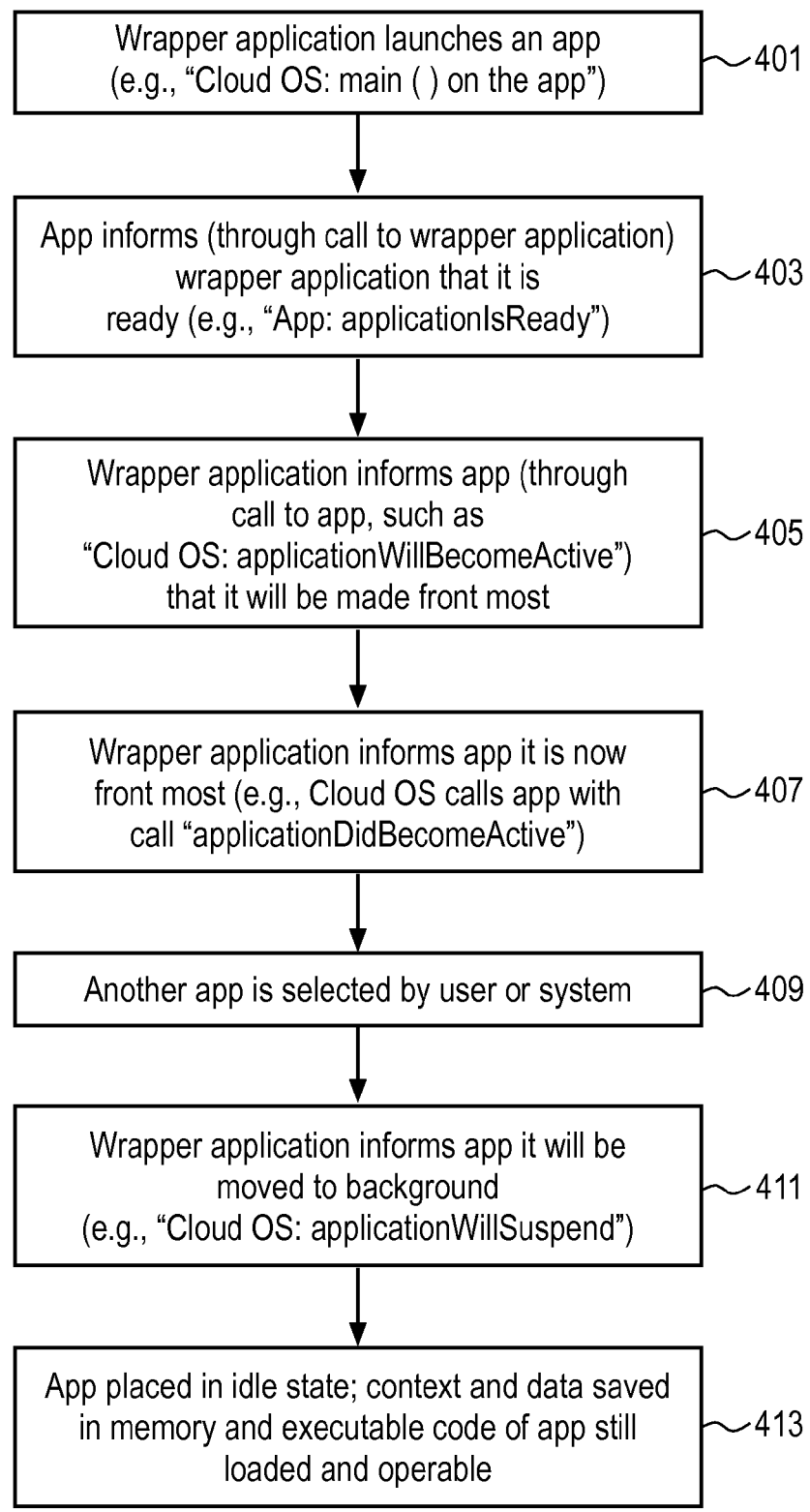
FIG. 4 is another flowchart showing an embodiment of the present invention.

FIG. 4 shows an example of a method in which particular calls are transferred between one or more applications in the set of applications 103 and the wrapper application 105; these calls can be through one or more APIs 104 which have been described herein. A detailed example of a particular API is also provided in the first appendix and the second appendix included herein. The calls shown and described in FIG. 4 are also shown in FIGS. 5A-5D, and in particular, are shown within startup sequence 503 and background sequence 505 in FIG. 5B. In particular, the method shown in FIG. 4 shows some of the calls performed in the startup sequence and background sequence in one embodiment of an implementation according to the flowchart shown in FIGS. 5A-5D. In operation 401, the wrapper application launches an application by making the call shown in operation 401 of FIG. 4. This call in turn causes the JavaScript of the selected application to be executed, in one embodiment, within an iframe of the wrapper application which is itself running on the web browser, such as web browser 107. The launched app will, in this embodiment, inform the wrapper application through a call to the wrapper application that the app is ready; operation 403 in FIG. 4 shows an example of such a call. Then in operation 405, the wrapper application informs the app that it will be made front most; an example of such a call is shown in operation 405 of FIG. 4. In one embodiment, the app will remain in an idle state as shown within startup sequence 503 until operation 407 in which the wrapper application informs the app that it is now front most by, for example, the call from the wrapper application to the app as shown within operation 407 of FIG. 4. At this point, the user can interact with the app which is now front most. For example, if the app is an email app, such as email app 1101 shown in FIG. 11, then the user can read emails, reply to emails, forward emails, create new emails, create new folders for emails, vie emails in folders, etc. While in the process of using the email application 1101, the user may decide to view the user's calendar or the user's address book, etc., which may cause the user to select another app as in operation 409. In one embodiment, this can be performed by selecting the switcher icon 813 or by selecting another app or application from a menu of applications in a pull-down menu or other menu structure or other user interface known in the art. This will cause, as described in conjunction with operations 313 and 315 the other application to be launched if it was not previously launched. Moreover, operations 401, 403, 405, and 407 can be repeated for the another application which was selected in operation 409. Meanwhile, wrapper application 105 can in operation 411, inform the app previously launched and executed that it will be moved to the background, and an example of such a call is provided in operation 411 shown in FIG. 4. The background state can be fully or partially hidden. The implementation shown in conjunction with FIGS. 8B and 11 through 15 involve an embodiment in which the background applications are completely hidden while the front most application appears to occupy most if not all of the web browser's window. Operation 413 shows that any application which is placed in the idle state by being moved to the background will continue to be loaded and operable and its executable code and the context and data associated with the executable code of the app is still in memory which can be the memory space specified by the web browser as described herein. This can allow a user to switch between applications hosted by different web servers in different domains without having to save state or log in or log out while switching between each of the applications hosted on the different web servers. This can allow an application to communicate with possibly multiple services on different hosts or web servers. For example, a calendar web application in the set 103 can communicate with a calendar web server but can, in one embodiment, also concurrently communicate with a contacts web server to auto-complete invitees to a calendar event using the user's address book on the contacts web server. In one embodiment, this can be achieved by the wrapper application 105 guaranteeing that any application in the set of applications will have a user who is authenticated until any one of the web servers indicates otherwise as a response to any request. In one embodiment, if an application receives a response from a web server claiming that the credentials or authentication data are invalid, an application should flush local data and caches and inform the wrapper application that the user is no longer authenticated, in which case the wrapper application in one embodiment can log the user out for all applications in the set of applications, thereby requiring the user to reenter authentication information, such as a user name and password.

Figure 5A:
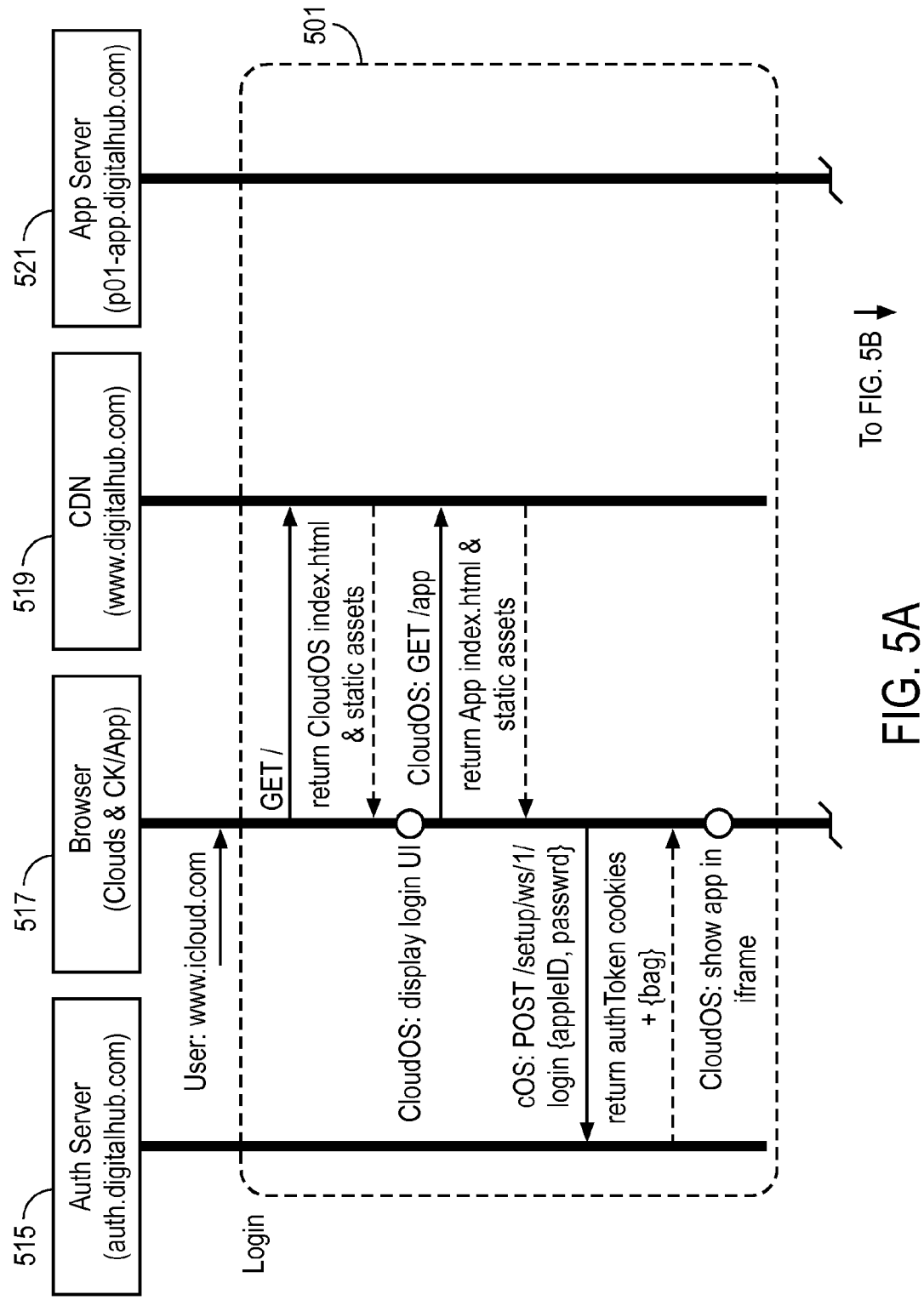
FIGS. 5A-5D show another flowchart illustrating an embodiment of the present invention.
Figure 5B:
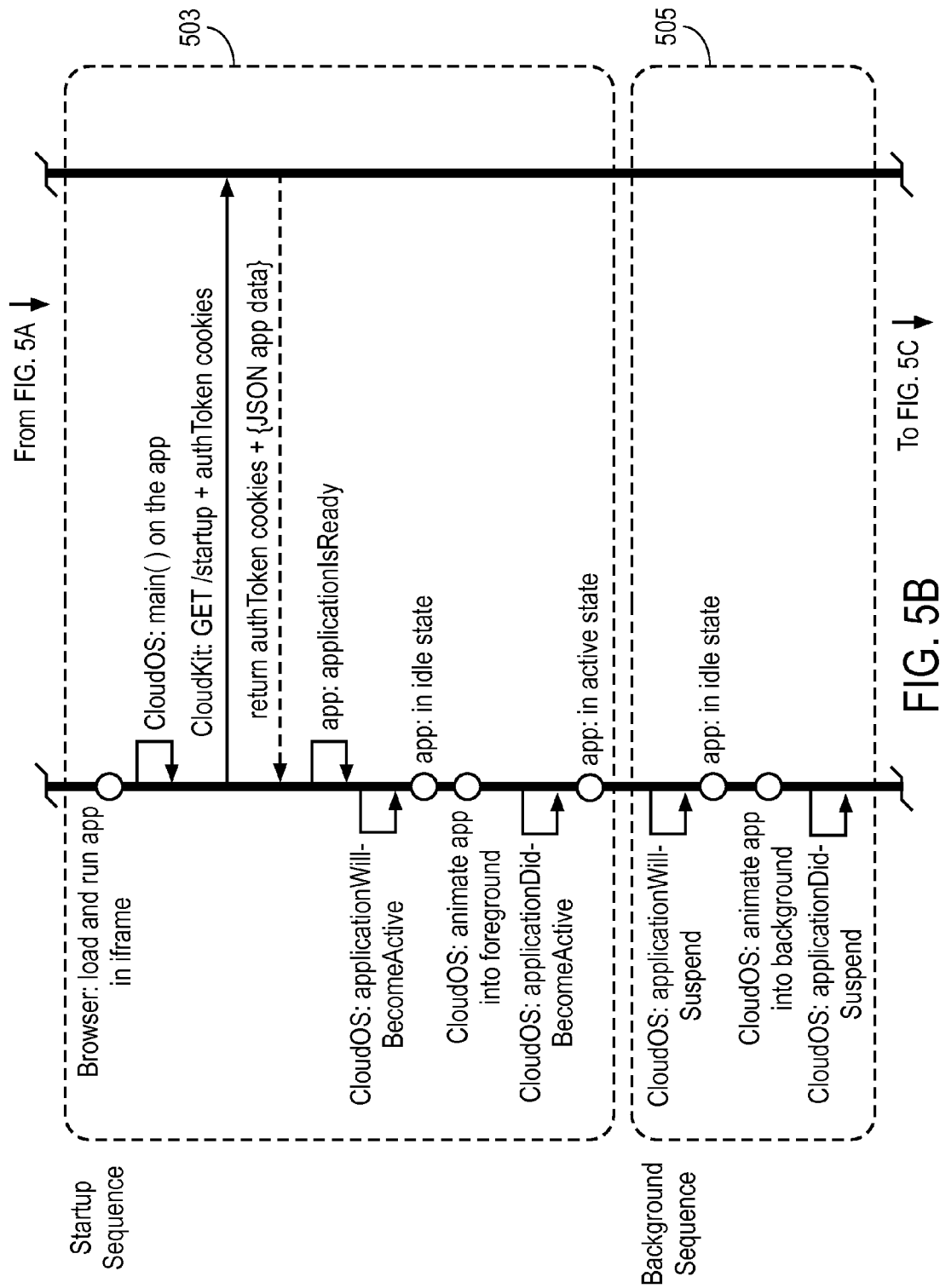
Figure 5C:
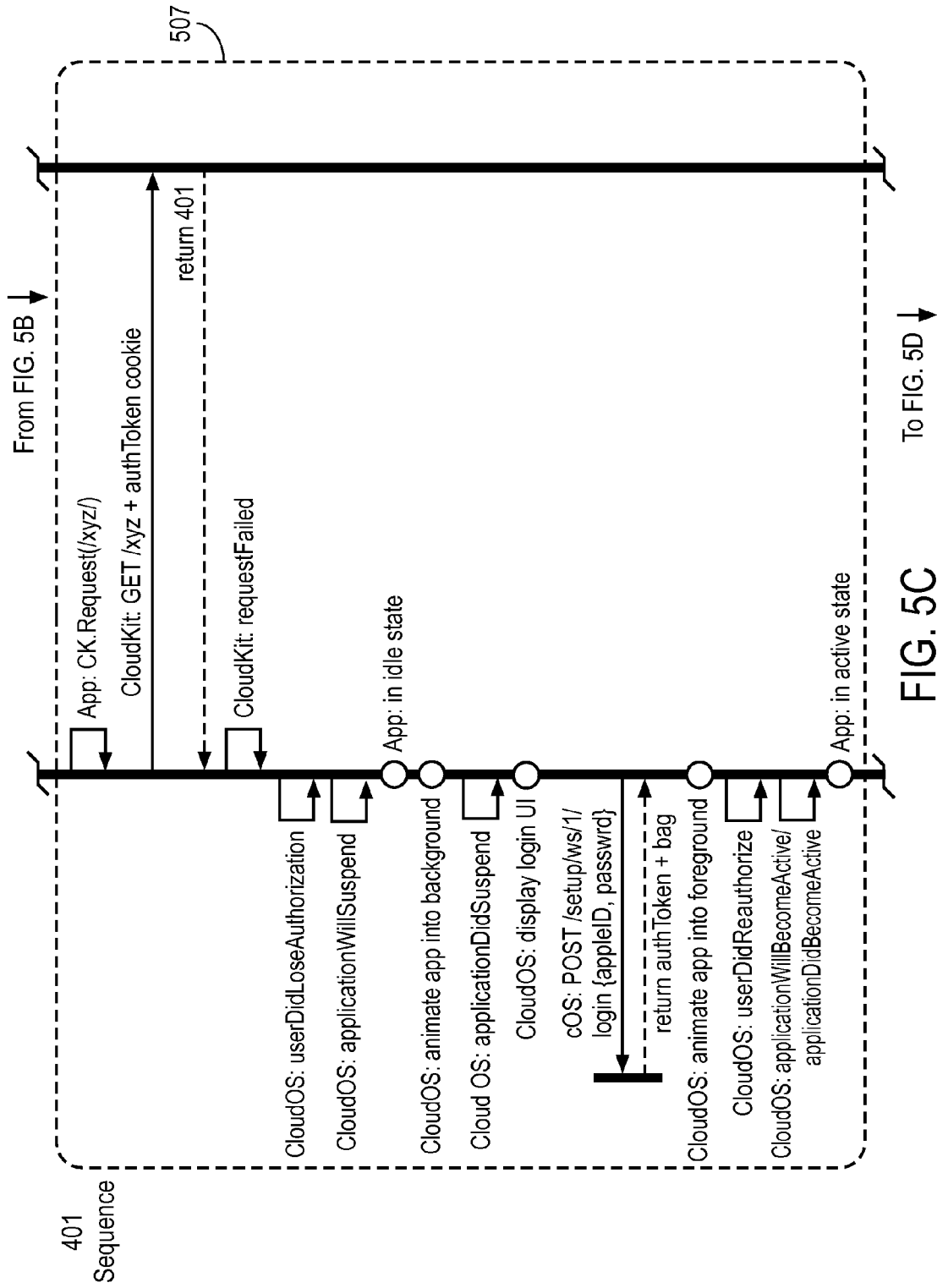

The flowchart of FIGS. 5A-5D shows the interaction between a client device running a web browser 517, which can be the web browser 107 of FIG. 1 and several other systems such as one or more web servers. In particular, authentication server 515 can be the setup service 607 shown in FIG. 6 and the app server 521 can be any one of the web servers 601A or 601B or 601C shown in FIG. 6. The content distribution network 519 can be part of the set of servers 601 or be a separate service or web server which is configured to provide the content of the wrapper application software and the applications in the set of applications 103 which run on the wrapper application 105. It will be understood that the application server 521 is, for example, an email server providing the web mail for the email application 1101 shown in FIG. 11 or alternatively the application server 521 can be a web server providing data for the contact application 1201 shown in FIG. 12, etc. Hence, application server 521 can be the email server 601A in FIG. 6 or can be the calendar server 601 shown in FIG. 6 or the contact server 601B shown in FIG. 6 or other web servers that interact with a web application. The method shown in FIGS. 5A-5D can begin with the user inputting the URL www.icloud.com, or another URL, into the URL text entry field in the web browser 517 which can be the web browser 107 shown in FIG. 1. If the set of applications and the wrapper application have not been previously cached in the web browser's cache, then as shown in FIG. 5A, one or more GET requests can be performed by the browser requesting the set of applications and the wrapper application which are returned to the browser as shown in FIG. 5A. The wrapper application as shown in FIG. 5A shows a log in user interface, and in response to a proper authenticated log in, the user can then obtain the set of applications after obtaining the wrapper application in response to the first GET request. After the user presents valid authentication or log in data, then the browser 517 communicates with the authentication server 515 which can be the setup server 607 shown in FIG. 6. In particular, referring to FIG. 6, the client device 605 communicates through one or more networks, such as the Internet 603 with the setup service 607 by providing the log in information which can include the user name and password. In response to the valid log in information, the setup server 607 sends back an authentication token which can be in the form of one or more cookies (which can be marked as SSL and HTTP—only so JavaScript cannot see them) and one or more addresses of the appropriate email servers and other servers which the web applications 103 use; the addresses in one embodiment can be referred to as a "bag" as shown in FIGS. 5A and 5C. After receiving data from the appropriate web server, an application in the set 103 presents its user interface (e.g., in the case of an email application in the set of applications 103, the email app 1101 as shown in FIG. 11 is shown within the web browser's window). This completes the log in process shown in log in sequence 501 of FIG. 5A. The downloaded applications and downloaded wrapper application can in one embodiment be maintained within the web browser's caches so that they do not need to be repeatedly downloaded whenever the browser is relaunched or whenever the main operating system is relaunched or restarted, etc. In another embodiment, the wrapper application and each of the applications in the set of applications 103 can be downloaded upon each user log in.

Figure 5D:
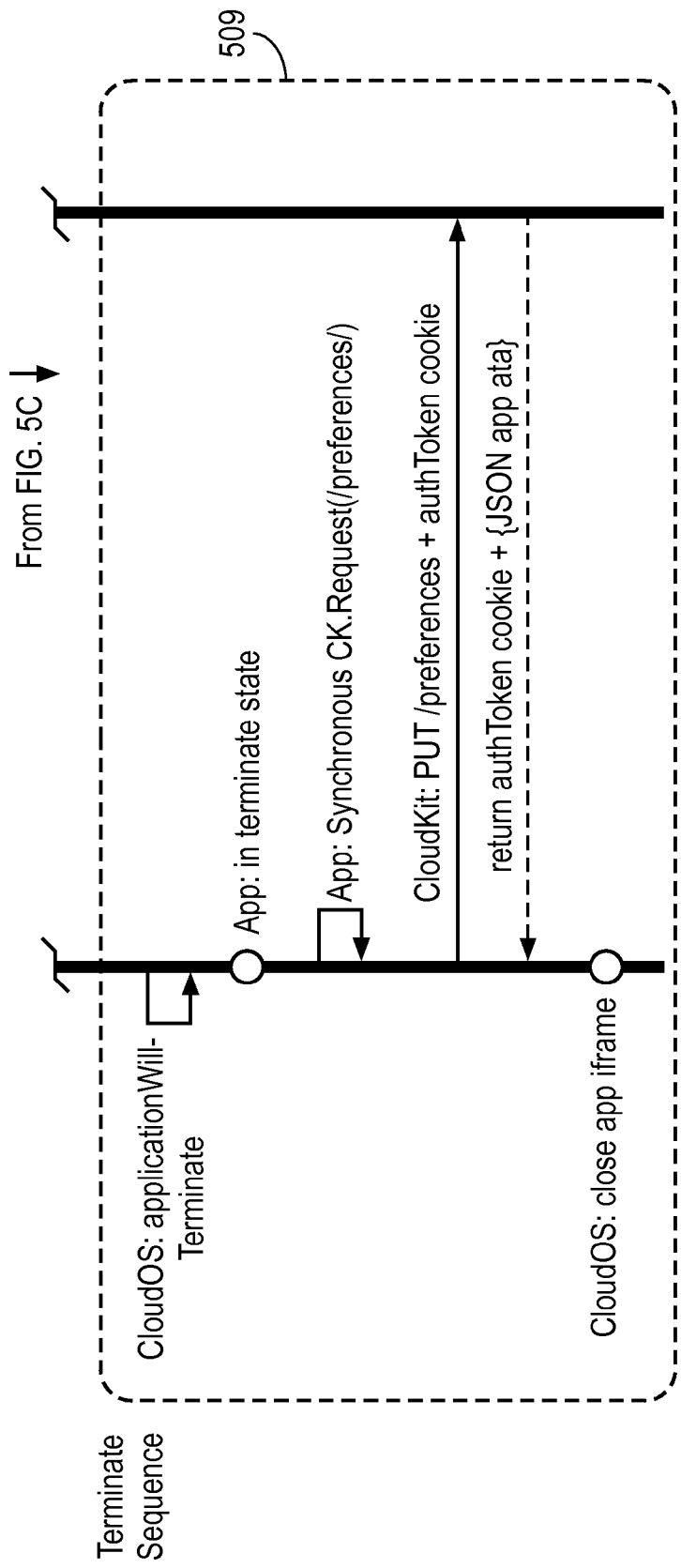

FIGS. 5A-5D show an example of particular calls between a wrapper application, referred to "cloud OS" in FIGS. 5A-5D and the one or more applications in the set of applications 103. FIGS. 5A-5D also show calls (e.g. "Cloudkit: GET/startup . . . " shown in FIG. 5B) made with an API that can be referred to as a Cloudkit API and this API provides a software framework for the set of applications. An example of a particular API for the cloud OS wrapper application is provided in the first appendix. An example of a particular API for the Cloudkit API is provided in the second appendix. FIGS. 5A-5D also illustrate operations or calls performed by the app and the web browser. FIGS. 5C-5D also provides examples of calls and operations which occur in a 401 sequence, shown as sequence 507 and in terminate sequence 509.

FIG. 6 shows an example of one or more web servers which can operate with one or more client devices through one or more networks while using the web application architecture described herein. The set of applications 103 along with the wrapper application 105 and the web browser 107 can be executing on a client device 605 which is coupled to the one or more networks 603 to in turn communicate with one or more web servers, such as web servers 601A, 601B, or 601C or other web servers not shown (such as map or navigation servers or iWork document servers or web servers for other web applications). The client device can be coupled to each of these web servers at the same time while each of their corresponding apps are executing as described herein. A set of the web servers, such as the web servers shown in FIG. 6, can be in different domains (e.g. one domain for email servers, such as icloudemail.com, and another domain for calendar servers, such as icloudcalendar.com); for web browsers, such as Safari and Firefox, that support CORS (Cross-Origin Resource Sharing), CORS can be used for cross domain requests. For other web browsers, an iframe can be used to proxy XHRs (XML HTTP Request) which communicate with the parent web browser window via postMessage. The setup service 607 can be one or more setup servers 607 which can act in the manner shown in conjunction with authentication server 515 shown in FIGS. 5A-5D.

Figure 7:
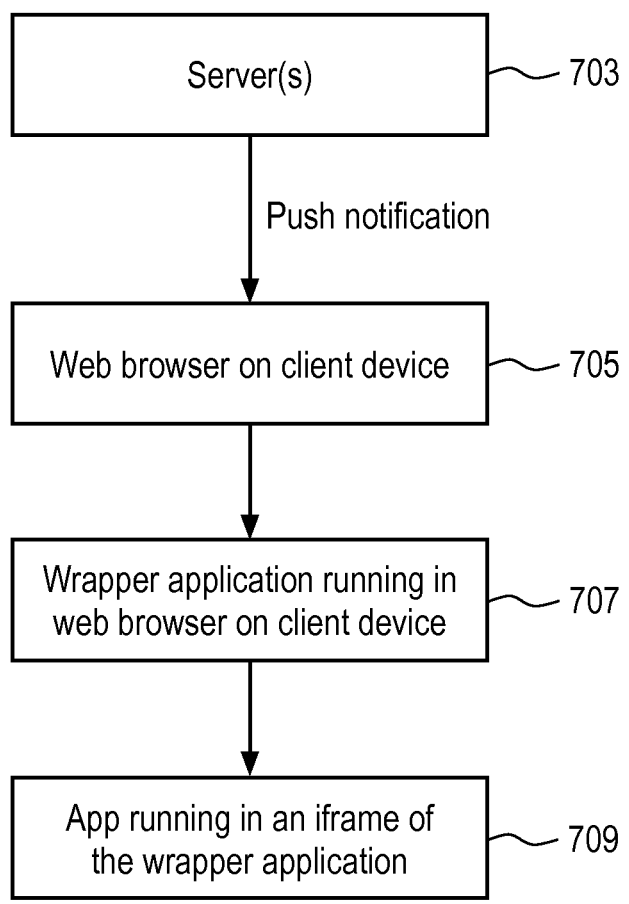
FIG. 7 shows an example of a method for implementing push notification in one or more embodiments of the present invention.

FIG. 7 illustrates an example of how push notification can be used to transmit a notification from one or more web servers to a particular application running in an iframe of the wrapper application 105. The push notification can begin by any one of the web servers, such as the email server 601 or a calendar service 601B or the contact server 601C, providing a notification to the web browser 705 on the client device, such as client device 605. The web browser can communicate through a call, such as through the API 106, to the wrapper application, such as wrapper application 105 which is running in the web browser on the client device. The wrapper application can then provide the notification to the app which interacts with the appropriate web server which sent the push notification as shown in 709.

FIG. 8A shows an example of a user interface on a display device 801 according to one embodiment of the present invention. Display device 801 can be the display 1670 of FIG. 16 which can be part of the data processing system hardware 110. The user interface can be created by the software stack shown in FIG. 1. It will be appreciated that other windows not shown FIG. 8A may also be displayed on a display device 801 within the desktop 802 as is known in the art. The user interface can include a menu bar 803 which is shown at the top of the screen of the display device 801; it will be understood that alternative locations of the menu bar may be used such as at the bottom of the screen or within each window, such as window 804. The example shown in FIG. 8A resembles the user interface of the Macintosh operating system known as Mac OS X in which the menu bar 803 is at the top of the screen. A web browser is currently executing, which can be web browser 107 which executes on the operating system 109 which can be, in one embodiment, the Macintosh operating system; alternatively, other operating systems can be used such as Windows, etc. The web browser is presenting a web browser window 804 in which the wrapper application 105 and the set of applications 103 can be executing. The web browser window 804 includes URL text entry field 806 and a title bar 805 which includes a title which, in one embodiment, is owned or controlled by wrapper application 105 as described herein. The web browser window 804 also includes a close button 807 and back and forward buttons 808 and 809. The back and forward buttons 808 and 809 can be conventional back and forward buttons used in a web browser. The web browser window 804 also displays a switcher icon 813 and a log out icon 814 which can be used as described herein. The user interface presented by the web browser window 804 includes a set of icons which each represent one of the applications in the set of applications 103. For example, the icon 810 can represent the mail or email application which is in the set of applications 103, and the icon 811 can represent the contacts application within the set of applications 103, and the icon 812 can represent the calendar application within the set of applications 103 etc. When the user selects one of those icons, the wrapper application 105 will then cause the launching (if not previously launched) of the selected application which corresponds to the selected icon as described herein.

Figure 13:
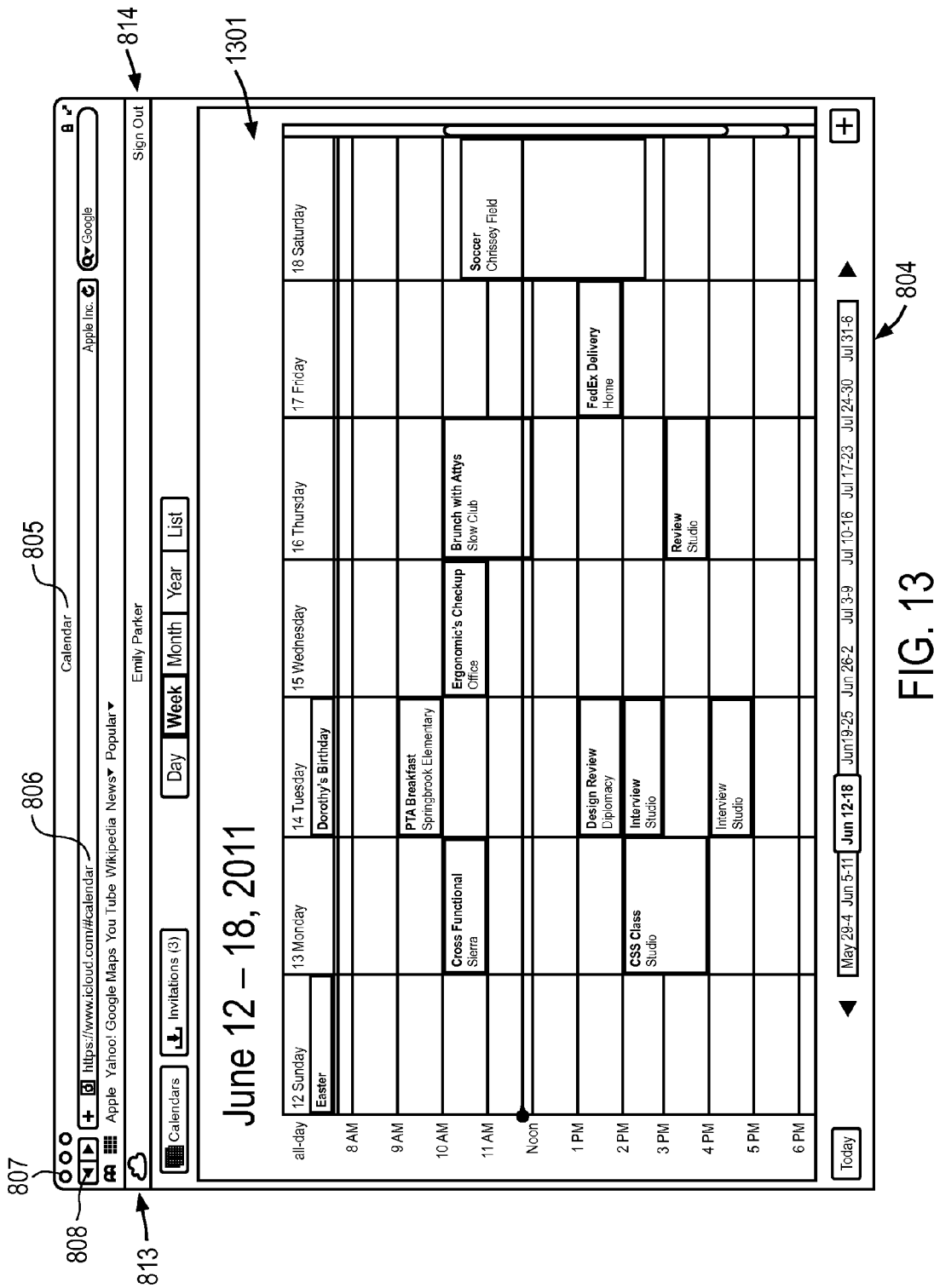
FIG. 13 is an example of a graphical user interface for a calendar web application.

FIGS. 11 through 15 provide examples of specific applications or web applications which are in the set of applications 103. In particular, FIG. 11 shows an email application as indicated by the word "mail" in the title bar 805. As previously described, the wrapper application through a set of calls with the web browser (e.g., through the API 106) controls the title bar 805 and can provide the proper title for the current front most application. FIG. 12 shows an example of the user interface of the contacts or address book application which is part of the set of applications 103 in one embodiment. FIG. 13 shows an example of the user interface of a calendar application which is one of the applications in the set of applications 103 in one embodiment.

Figure 14:
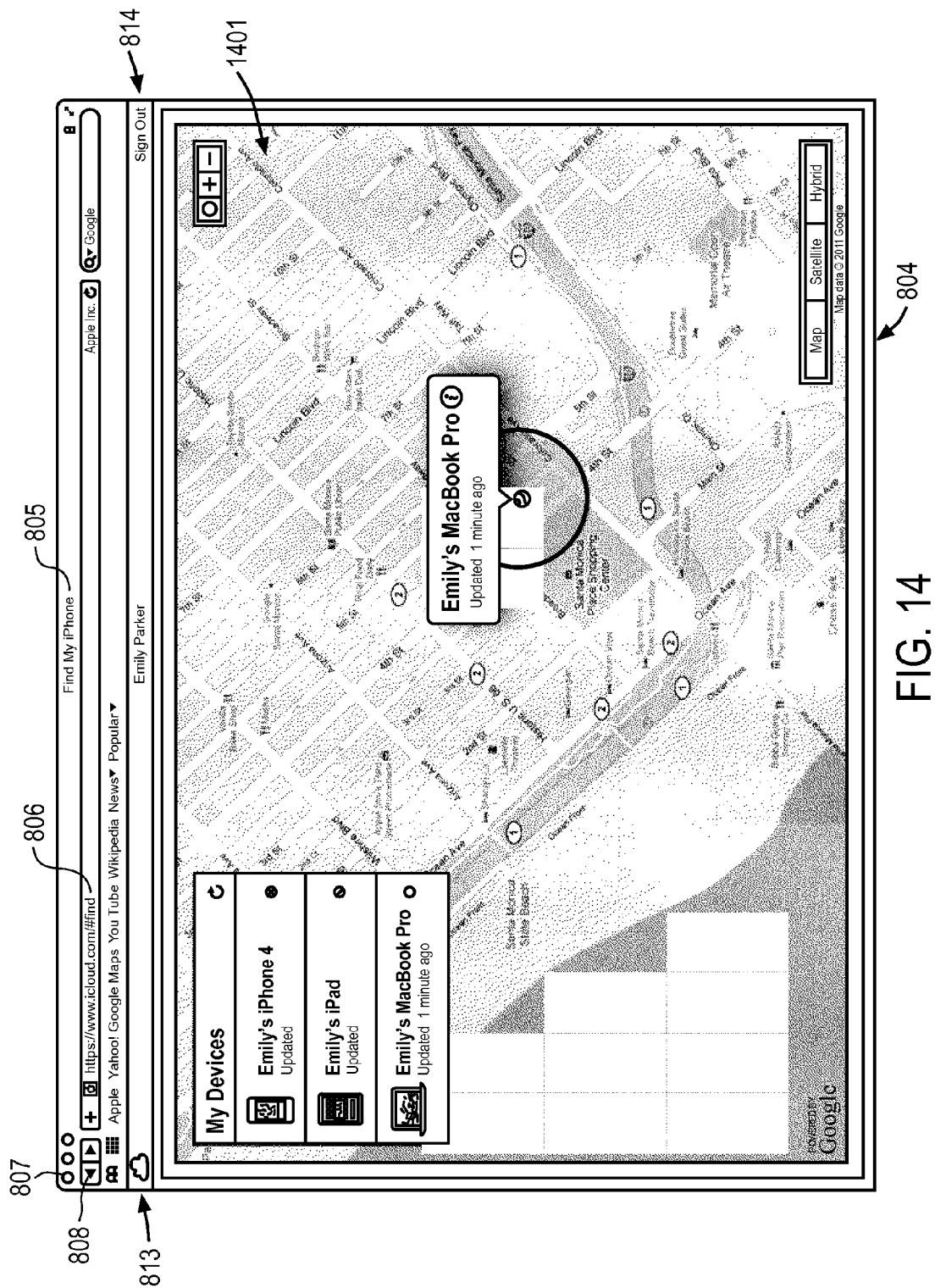
FIG. 14 is an example of a graphical user interface for a map or map assisted finding web application.
Figure 15:
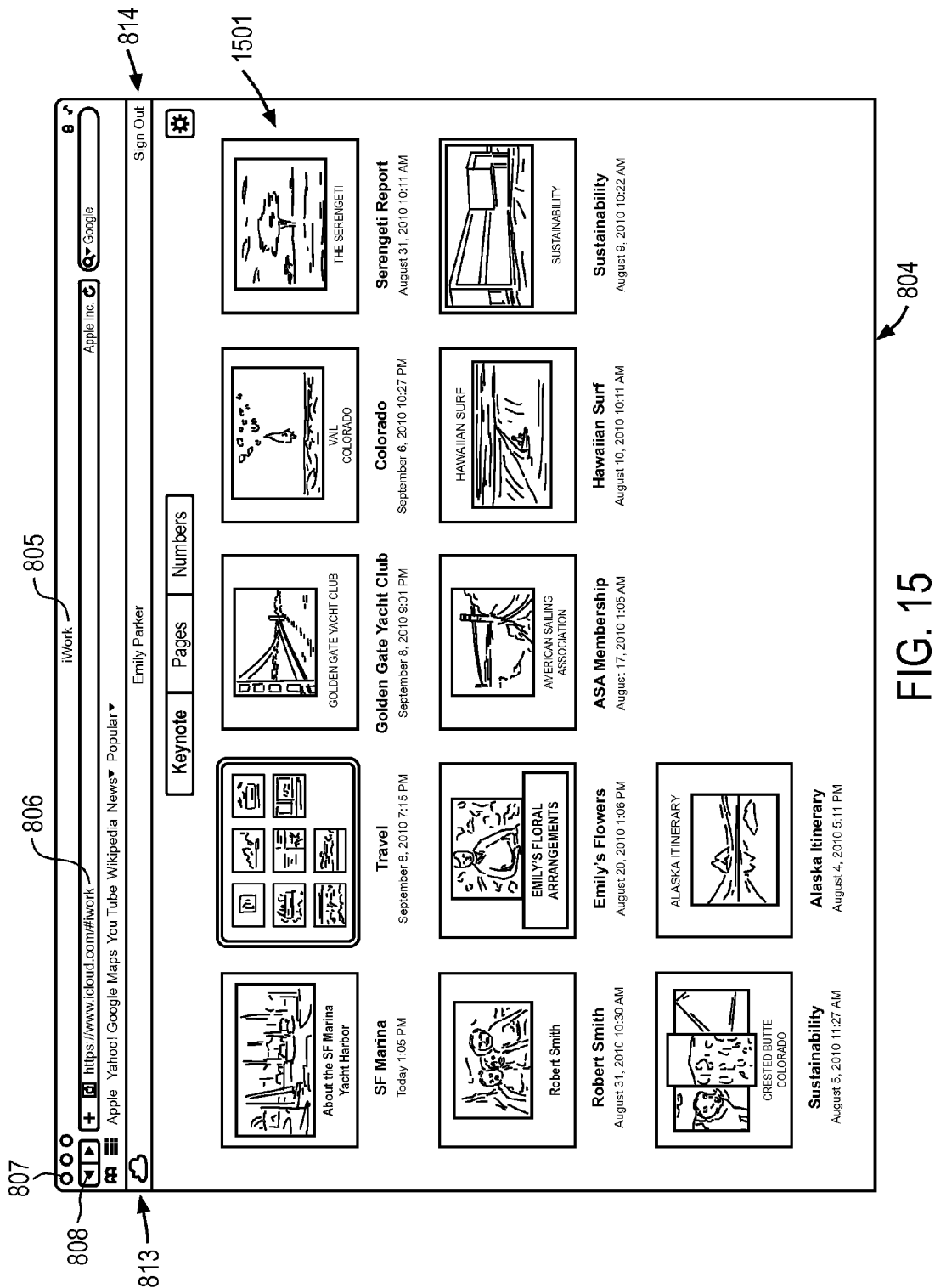
FIG. 15 is an example of a graphical user interface for allowing access to user documents such as word processing documents, presentation documents, and spreadsheet documents.

FIG. 14 shows an example of a map application which can be used to find the device, such as a smart phone, and which can be one of the applications in the set of applications 103 according to one embodiment. FIG. 15 is an example of a user interface to allow the user to access and/or interact with a collection of documents, such as presentation documents, word processing documents, and spreadsheets; in particular, document application 1501 allows the user to interact with documents stored by the user on one or more web servers.

Figure 16:
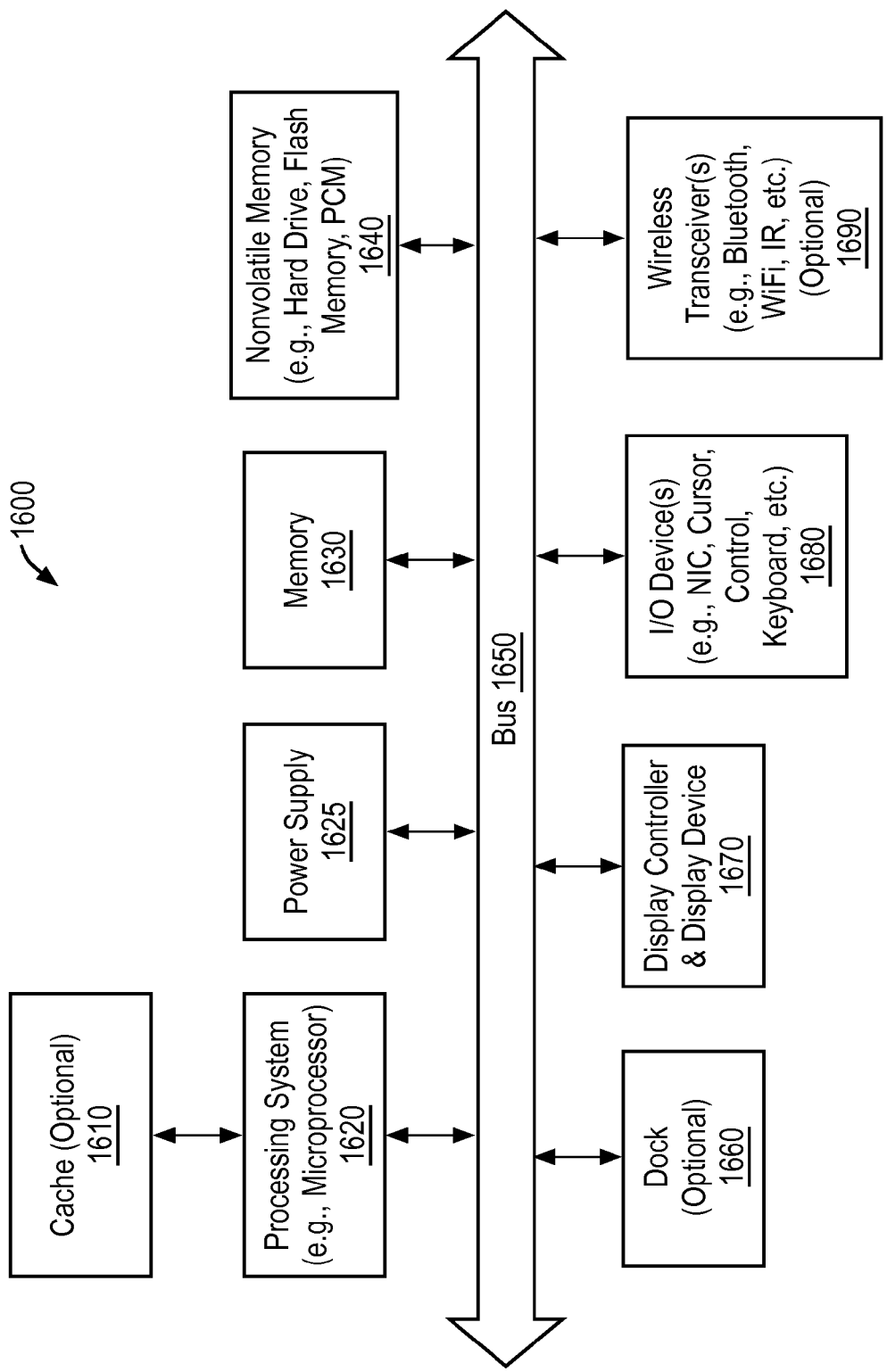
FIG. 16 shows, in block diagram form, an example of a data processing system which can be used in various embodiments of the present invention.

FIG. 16 is a block diagram illustrating an exemplary data processing system, such as a computer system, which may be used in some embodiments of the invention. It should be understood that while FIG. 16 illustrates various components of a computer system, it is not intended to represent any particular architecture or manner of interconnecting the components as such details are not germane to the present invention. It will be appreciated that other data processing systems such as other computer systems that have fewer components or more components may also be used with the present invention.

As illustrated in FIG. 16, the system 1600, which is a form of a data processing system, includes the bus(es) 1650 which is coupled with the processing system 1620, power supply 1625, memory 1630, and the nonvolatile memory 1640 (e.g., a hard drive, flash memory, Phase-Change Memory (PCM), etc.). The bus(es) 1650 may be connected to each other through various bridges, controllers, and/or adapters as is well known in the rt. The processing system 1620 may retrieve stored instruction(s) from the memory 1630 and/or the nonvolatile memory 1640, and execute the instructions to perform operations as described above. The bus 1650 interconnects the above components together and also interconnects those components to the optional dock 1660, the display controller & display device 1670, Input/Output devices 1680 (e.g., NIC (Network Interface Card), a cursor control (e.g., mouse, touch screen, touchpad, etc.), a keyboard, etc.), and the optional wireless transceiver(s) 1690 (e.g., Bluetooth, WiFi, Infrared, cellular telephone receiver etc.). The data processing system 1600 may be a handheld computer, a personal digital assistant (PDA), a mobile telephone, a portable gaming system, a portable media player, a tablet or a handheld computing device which may include a mobile telephone, a media player, and/or a gaming system or other type of consumer electronic devices. As another example, the data processing system 1600 may be a network computer or an embedded processing device within another device.

One or more Application Programming Interfaces (APIs) may be used in some embodiments. An API an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can pr vide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the AI-implementing component or to initiate performance of an operation or computation provided by the API-implementing component. By way of example, the API-implementing component and the API-calling component may each be any one of an operating system, a library, a device driver, an API, an application program, or other module (t should be understood that the API-implementing component and thr API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) a component (i.e., on a different data processing system from API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 18:
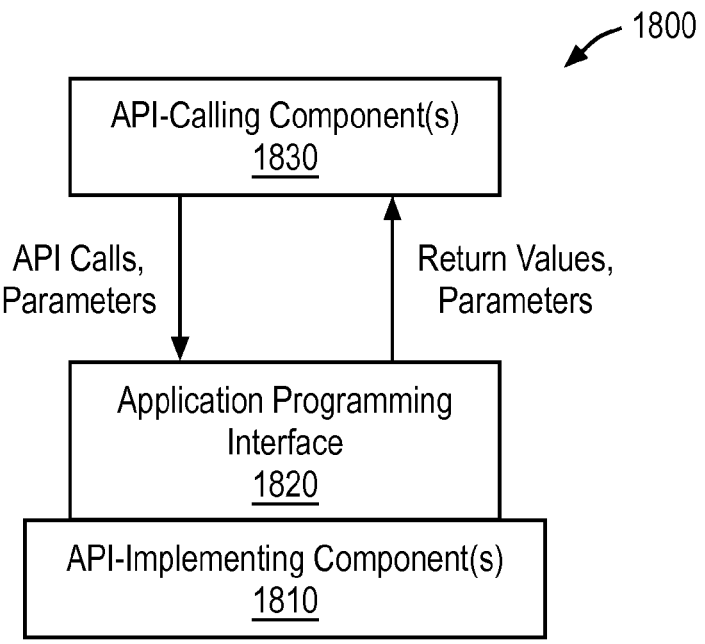
FIG. 18 illustrates a block diagram of an exemplary API architecture which is usable in some embodiments of the invention.

FIG. 18 is a block diagram illustrating an exemplary API architecture, which may be used in some embodiments of the invention. As shown in FIG. 18, the API architecture 1800 includes the API-implementing component 1810 (e.g. an operating system, a library, a device driver, an API, an application program, software or other module) that implements the API 1820. The API 1820 specifies one or more functions, methods, classes, objects, protocols, data structures, formats and/or other features of the API-implementing component that may be used by the API-calling component 1830. The API 1820 can specify at least one calling convention that specifies how a function in the API-implementing component receives parameters from the API-calling component and how the function returns a result to the API-calling component. The API-calling component 1830 (e.g., an operating system, a library, a device driver, an API, an application program, software or other module), makes API calls through the API 1820 to access and use the features of the API-implementing component 1810 that are specified by the API 1820. The API-implementing component 1810 may return a value through the API 1820 to the API-calling component 1830 in response to an API call.

It will be appreciated that the API-implementing component 1810 may include additional functions, methods, classes, data structures, and/or other features that are not specified through the API 1820 and are not available to the API-calling component 1830. It should be understood that the API-calling component 1830 may be on the same system as the API-implementing component 1810 or may be located remotely and accesses the API-implementing component 1810 using the API 1820 over a network. While FIG. 18 illustrates a single API-calling component 1830 interacting with the API 1820, it should be understood that other API-calling components, which may be written in different languages (or the same language) than the API-calling component 1830, may use the API 1820.

The API-implementing component 1810, the API 1820, and the API-calling component 1830 may be stored in a machine-readable non-transitory storage medium, which includes any mechanism for storing information in a form readable by a machine (e.g., a computer or other data processing system). For example, a machine-readable medium includes magnetic disks, optical disks, random access memory; read only memory, flash memory devices, etc. and can be a local storage medium or a storage medium on a remote device that is coupled to a client device by one or more networks.

Figure 17:
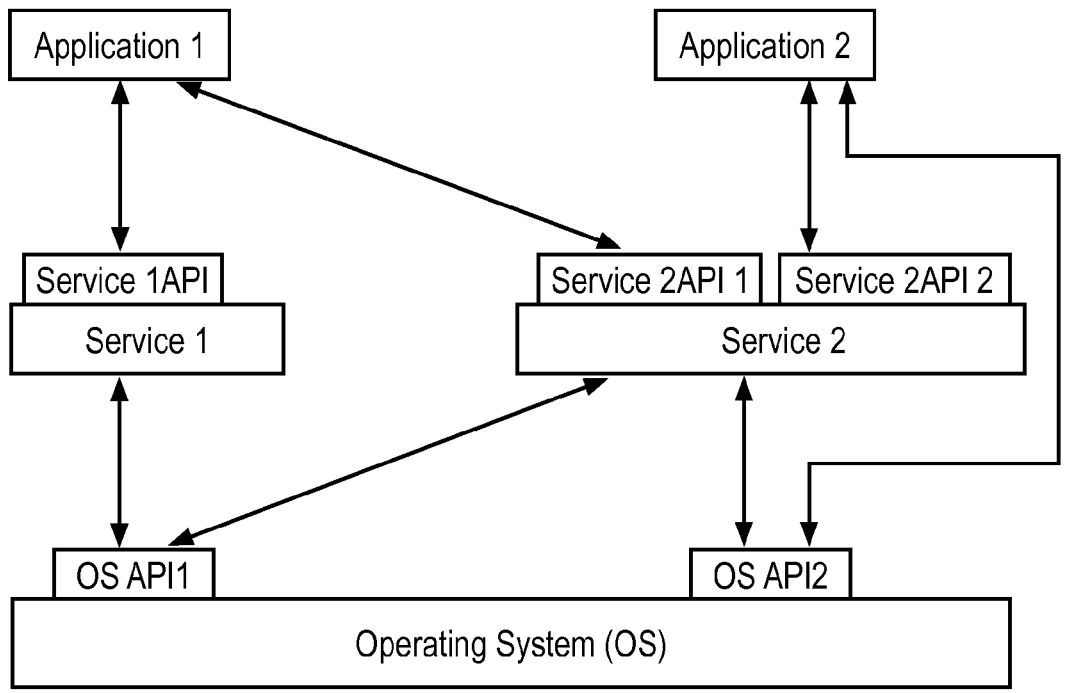
FIG. 17 shows an exemplary embodiment of a software stack usable in some embodiments of the present invention.

In FIG. 17 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A machine readable non-transitory storage medium containing executable instructions which, when executed on a data processing system, cause the data processing system to perform operations comprising:
    executing a first Operating System (OS);
    executing a web browser on the first OS, wherein the web browser processes a web page encoded in a mark-up language;
    executing a wrapper application on the web browser, the wrapper application providing life cycle management for at least a first application in a set of applications executing in a same web browser window, and provides for switching the first application from a front most state to a not front most state, wherein the first application remains in an executing state, with context and data associated with the executable instructions of the first application saved, after the first application is switched to a not front most state, the context including a state of text input focus, text input position, and user data entered;
    executing, on the wrapper application, the set of applications including at least the first application, each application in the set of applications executing in a corresponding frame of the web page, wherein the wrapper application handles errors separately for each application in the set of applications and allows restarting of the first application while other applications in the set of applications continue executing;
    transferring at least one call between the wrapper application and the first application when the first application is launched for execution and at least one call between the wrapper application and the first application when the first application is terminated; and
    transferring at least one call between the web browser and the wrapper application when the first application is launched.

2. The medium as in claim 1 wherein transferring at least one call comprises one of issuing, initiating, invoking or receiving a call or message, and wherein the first OS is a preemptive, multitasking OS, and where a memory space of the wrapper application is defined by the memory space of the web browser, and wherein the web browser is a standard web browser.

3. The medium as in claim 2 wherein the web page is retrieved by the web browser through one or more URLs (Uniform Resource Locator) and wherein the web browser is configured to process, using a layout engine in the web browser, the mark-up language of the web page into a DOM (Document Object Model) of the web page and is configured to process a cascading style sheet associated with the web page to present the web page.

4. The medium as in claim 2 wherein a set of applications execute on the wrapper application and the set includes the first application which is an email application, a second application which is a calendar application and a third application which is a contacts or address book application and wherein each application in the set is presented, when it is front most, within the same single window of the web browser.

5. The medium as in claim 4 wherein the wrapper application operates as an operating system for the set of applications and each application in the set is written at least in part in JavaScript.

6. The medium as in claim 4 wherein the corresponding frame for each application in the set is an iframe and each application presented as a front most application or not presented as the front most application through an action by the wrapper application, and the wrapper application enables push notifications to be provided for an application not presented as the front most application.

7. The medium as in claim 6 wherein the wrapper application generates data for display of a set of icons, each icon in the set of icons representing an application in the set of applications, in response to a call from the web browser, the call being caused by a selection of a first icon, in the same single window in the web browser.

8. The medium as in claim 7 wherein the selection of the first icon is used to switch between the applications and causes presentation of the set of icons in the same single window of the web browser.

9. The medium as in claim 8 wherein each application in the set of applications remains in an executing state, with context and data saved, after the application is switched from the front most application to a not front most state.

10. The medium as in claim 9 wherein the same, single window of the web browser does not include tabbed windows, and wherein the wrapper application owns a URL text entry field and a title bar of the same, single window of the web browser.

11. The medium as in claim 9 wherein the wrapper application authenticates a user for each application in the set of applications and wherein when a user is logged out in one of the applications in the set or access expires in one of the applications in the set, then the wrapper application logs the user out of remaining applications in the set of applications.

12. The medium as in claim 1 wherein the wrapper application receives address information for web servers for each of the applications in the set of applications in response to transmitting proper user authentication data to a setup service.

13. A machine readable non-transitory storage medium containing executable instructions for execution by a data processing system, the instructions comprising:
    a wrapper application configured to run on a web browser which runs on an operating system of the data processing system, wherein the web browser is to process a web page encoded in a mark-up language; and
    a set of applications configured to run on the wrapper application in a same web browser window, the set of applications providing data from one or more web servers, wherein the wrapper application provides life cycle management for each application in the set of applications, handles errors separately for each application in the set of applications, allows restart of an application while other applications in the set of applications continue executing, and provides for switching between the applications in the set of applications, the switching to cause an application to switch from a front most state to a not front most state, wherein each application remains in an executing state, with context and data associated with the executable instructions of the application saved, after the application is switched from a front most state to a not front most state, the context including a state of text input focus, text input position, and user data entered.

14. The medium as in claim 13 wherein calls are transferred between the wrapper application and each application when the application is launched and when the application is switched between front most and not front most, and wherein life cycle management comprises launching and quitting of each application in the set of applications.

15. The medium as in claim 14, wherein the wrapper application and the set of applications are configured to execute in a same, single web browser window, each application in the set of applications executes in a corresponding iframe of the web page, each application in the set of applications remains executing when in the not front most state and wherein the wrapper application presents a set of icons, each icon representing an application in the set of applications, in response to a call from the web browser, the call being caused by a selection of a first icon in the same, single web browser window, and the first icon being used to switch between the applications in the set of applications.

16. A machine implemented method comprising:
    executing a first Operating System (OS);
    executing a web browser on the first OS, wherein the web browser processes a web page encoded in a mark-up language;
    executing a wrapper application on the web browser, the wrapper application providing life cycle management for at least a first application in a set of applications executing on a same web browser window, wherein the wrapper application handles errors separately for each application in the set of applications and allows restarting of the first application while other applications in the set of applications continue executing;
    executing the set of applications on the wrapper application, wherein each application in the set of applications executes in a corresponding iframe of the web page, the first application is presented as a front most application or not presented as the front most application through an action by the wrapper application, and wherein each application in the set of applications remains in an executing state, with context and data associated with executable instructions of the application saved, after the application is switched from the front most application to a not front most state, the context including a state of text input focus, text input position, and user data entered;
    transferring at least one call between the wrapper application and the first application when the first application is launched for execution and at least one call between the wrapper application and the first application when the first application is terminated; and
    transferring at least one call between the web browser and the wrapper application when the first application is launched wherein transferring at least one call comprises one of issuing, initiating, invoking or receiving a call or message, and wherein the first OS is a preemptive, multitasking OS, and where a memory space of the wrapper application is defined by the memory space of the web browser; and wherein the web browser is a software application program that processes a web page encoded in a mark-up language, the web page retrieved by the web browser through one or more URLs (Uniform Resource Locator) and wherein the web browser is configured to process, using a layout engine in the web browser, the mark-up language of the web page into a DOM (Document Object Model) of the web page and is configured to process a cascading style sheet associated with the web page to present the web page.

17. The method as in claim 16 wherein a set of applications execute in the wrapper application and the set includes the first application which is an email application, a second application which is a calendar application and a third application which is a contacts or address book application and wherein each application in the set is presented, when it is front most, within the same single window of the web browser and wherein the wrapper application operates as an operating system for the set of applications and each application in the set is written at least in part in JavaScript.

18. A data processing system comprising:
    means for executing a first Operating System (OS);
    means for executing a web browser on the first OS;
    means for executing a wrapper application within memory space defined by the memory space of the web browser, the wrapper application providing life cycle management for multiple applications in a set of applications executing in a same web browser window, wherein the wrapper application handles errors separately for each application in the set of applications and allows restarting of the first application while other applications in the set of applications continue executing;
    means for executing the set of applications on the wrapper application, wherein the wrapper application and the set of applications are configured to execute in a same, single web page in the web browser, wherein each application in the set executes in a corresponding iframe of the web page, the corresponding iframe for each application in the set presented as a front most application or not presented as the front most application through an action by the wrapper application, each application in the set of applications remains in an executing state, with context and data associated with executable instructions of the application saved, after the application is switched from the front most application to a not front most state, and the context includes a state of text input focus, text input position, and user data entered;
    means for transferring at least one call between the wrapper application and a first application in the set of applications when the first application is launched for execution and at least one call between the wrapper application and the first application when the first application is terminated; and
    means for transferring at least one call between the web browser and the wrapper application when the first application is launched.

19. The data processing system as in claim 18 wherein transferring at least one call comprises one of issuing, initiating, invoking or receiving a call or message, and wherein the first OS is a preemptive, multitasking OS, and where a memory space of the wrapper application is defined by the memory space of the web browser and wherein the web browser is a software application program that processes a web page encoded in a mark-up language, the web page retrieved by the web browser through one or more URLs (Uniform Resource Locator) and wherein the web browser is configured to process, using a layout engine in the web browser, the mark-up language of the web page into a DOM (Document Object Model) of the web page and is configured to process a cascading style sheet associated with the web page to present the web page.

* * * * *